United States Patent
Matsunobu et al.

(10) Patent No.: US 10,277,832 B2
(45) Date of Patent: Apr. 30, 2019

(54) IMAGE PROCESSING METHOD AND IMAGE PROCESSING SYSTEM

(71) Applicant: Panasonic Intellectual Property Management Co., Ltd., Osaka (JP)

(72) Inventors: Toru Matsunobu, Osaka (JP); Toshiyasu Sugio, Osaka (JP); Youji Shibahara, Tokyo (JP); Yuki Maruyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 60 days.

(21) Appl. No.: 15/358,297

(22) Filed: Nov. 22, 2016

(65) Prior Publication Data
US 2017/0078646 A1   Mar. 16, 2017

Related U.S. Application Data

(63) Continuation of application No. PCT/JP2015/002179, filed on Apr. 22, 2015.
(Continued)

(30) Foreign Application Priority Data

Feb. 9, 2015 (JP) ................................. 2015-023548

(51) Int. Cl.
*H04N 5/243* (2006.01)
*H04N 5/247* (2006.01)
(Continued)

(52) U.S. Cl.
CPC ........... *H04N 5/247* (2013.01); *H04N 13/243* (2018.05); *H04N 13/296* (2018.05); *H04N 2013/0096* (2013.01)

(58) Field of Classification Search
CPC .. G06F 17/273; G06F 17/275; G06F 17/2863; H04N 13/0242; H04N 13/0296; H04N 2013/0096; H04N 5/247
(Continued)

(56) References Cited

U.S. PATENT DOCUMENTS 5,969,722 A * 10/1999 Palm ....................... G06T 17/20
                                                     250/559.19
9,155,967 B2 * 10/2015 Koganezawa ........ G06T 19/006
(Continued)

FOREIGN PATENT DOCUMENTS

JP   2006-284372   10/2006
JP   2009-237845   10/2009
(Continued)

OTHER PUBLICATIONS

Mathai et al, Automatic 2D to 3D video and image conversion based on global depth map (Year: 2015).*
(Continued)

*Primary Examiner* — Shan E Elahi
(74) *Attorney, Agent, or Firm* — Greenblum & Bernstein, P.L.C.

(57) ABSTRACT

An image processing method for processing a plurality of images is provided. The image processing method includes: acquiring a plurality of first images, each of the plurality of first images taken with each of a plurality of imaging devices; acquiring first imaging clock times, each of the first imaging clock times corresponding to each of the plurality of first images; selecting a plurality of second images from the plurality of first images; and generating an image set constructed with the plurality of second images. Each of second imaging clock times correspond to each of the plurality of second images. The second imaging clock times
(Continued)

are (i) substantially matched with each other and (ii) included in the first imaging clock times.

15 Claims, 15 Drawing Sheets

Related U.S. Application Data

(60) Provisional application No. 62/014,737, filed on Jun. 20, 2014.

(51) Int. Cl.
*H04N 13/00* (2018.01)
*H04N 13/296* (2018.01)
*H04N 13/243* (2018.01)

(58) Field of Classification Search
USPC .......................................................... 348/47
See application file for complete search history.

(56) References Cited

U.S. PATENT DOCUMENTS

| | | | | |
|---|---|---|---|---|
| 2005/0046717 A1* | 3/2005 | Lapstun | ............... | H04N 5/3559 348/308 |
| 2006/0222238 A1* | 10/2006 | Nishiyama | ............... | G06K 9/32 382/154 |
| 2006/0274185 A1* | 12/2006 | Safai | ...................... | H04N 5/232 348/333.11 |
| 2012/0194513 A1 | 8/2012 | Sakurai et al. | | |
| 2012/0262455 A1* | 10/2012 | Watanabe | ................. | G06T 7/75 345/420 |
| 2013/0100165 A1* | 4/2013 | Komiyama | ............ | G09G 5/397 345/634 |
| 2015/0254872 A1* | 9/2015 | de Almeida Barreto | .................... | G06T 11/001 382/103 |

FOREIGN PATENT DOCUMENTS

| | | |
|---|---|---|
| JP | 2010-250452 | 11/2010 |
| JP | 2012-160937 | 8/2012 |
| JP | 2012-216939 | 11/2012 |
| WO | 2010/119852 | 10/2010 |

OTHER PUBLICATIONS

International Search Report of PCT application No. PCT/JP2015/002179 dated Jul. 7, 2015.

* cited by examiner

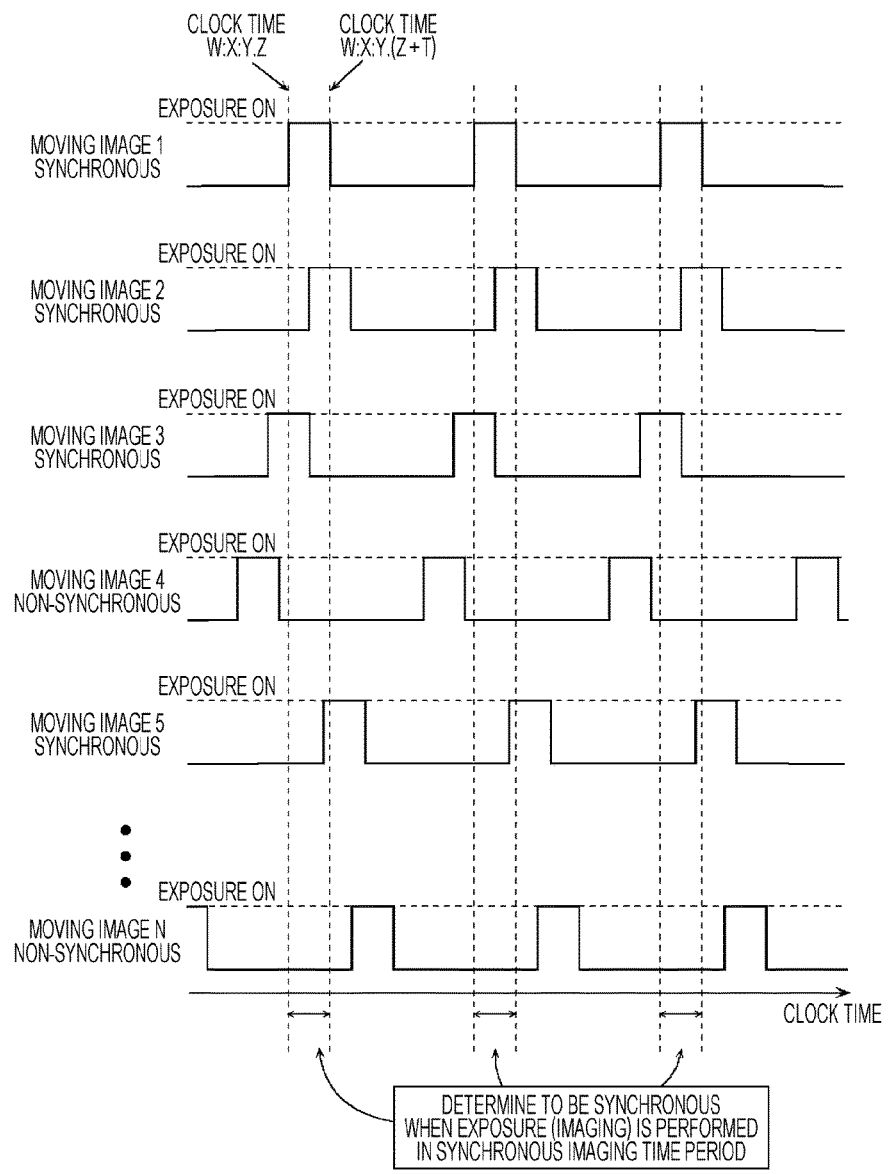

IMAGE PROCESSING METHOD AND IMAGE PROCESSING SYSTEM

BACKGROUND

1. Technical Field

The present disclosure relates to an image processing method and an image processing system, particularly to an image processing method and an image processing device for restoring a three-dimensional model of a subject using a plurality of images acquired with a plurality of imaging devices.

2. Description of the Related Art

In a three-dimensional reconfiguration technology of a computer vision field, a plurality of two-dimensional images are correlated with each other, and a three-dimensional model is restored, namely, a three-dimensional position of a camera posture or a subject is estimated.

For example, in PTL 1, in initial several frames of a moving image input from a monocular camera, a feature point is extracted, and a feature point position is correlated through frame matching. In the subsequent frame, feature point position information is acquired by time-series feature point tracking in which an extended Kalman filter is used. The three-dimensional model is restored by SfM (Structure from Motion) in which the correlated feature point is used.

In PTL 2, the three-dimensional model is reconfigured by performing feature point matching using a key frame that is periodically acquired from two moving images taken synchronously with a stereo camera. Additionally, the three-dimensional model between key frames can be reconfigured using a change in time direction of the feature point.

In PTL 3, calibration is performed among at least three cameras, each camera coordinate system is transformed into a virtual camera coordinate system at an arbitrary viewpoint using an acquired camera parameter. In the virtual camera coordinate system, the correspondence is performed by block matching between coordinate-transformed images to estimate distance information. An image from the viewpoint of the virtual camera is generated based on the estimated distance information.

CITATION LIST

Patent Literatures

PTL 1: Unexamined Japanese Patent Publication No. 2009-237845
PTL 2: Unexamined Japanese Patent Publication No. 2012-160937
PTL 3: Unexamined Japanese Patent Publication No. 2010-250452

However, in the technologies of PTLs 1 to 3, there is a problem in that a high-accuracy three-dimensional model can hardly be restored.

SUMMARY

One non-limiting and exemplary embodiment provides an image processing method and an image processing system for easily restoring the high-accuracy three-dimensional model.

In one general aspect, the techniques disclosed here feature an image processing method including: acquiring an image taken with each of a plurality of imaging devices; acquiring an imaging clock time of each of a plurality of acquired images; and selecting the plurality of images, in which imaging clock times are substantially matched with each other, from the plurality of acquired images to generate an image set constructed with the plurality of selected images.

The use of the image processing method and image processing system of the present disclosure can easily restore the high-accuracy three-dimensional model.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

The comprehensive or specific aspects may be implemented by a system, a device, an integrated circuit, a computer program, a recording medium such as a computer-readable CD-ROM, or any combination of the system, the method, the integrated circuit, the computer program, and the recording medium.

BRIEF DESCRIPTION OF THE DRAWINGS

FIG. 4 is a view illustrating an example of a method for selecting a plurality of moving images acquired through the synchronous imaging in the first exemplary embodiment;

DETAILED DESCRIPTION (Underlying Knowledge of the Present Disclosure)

First, synchronous imaging in one aspect of the present disclosure will be defined.

Figure 1A:
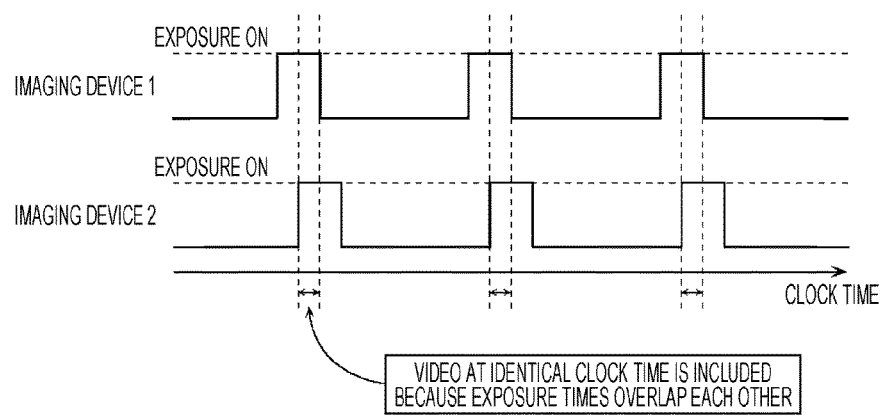
FIG. 1A is a view illustrating an example of synchronous imaging of a moving image.
Figure 1B:
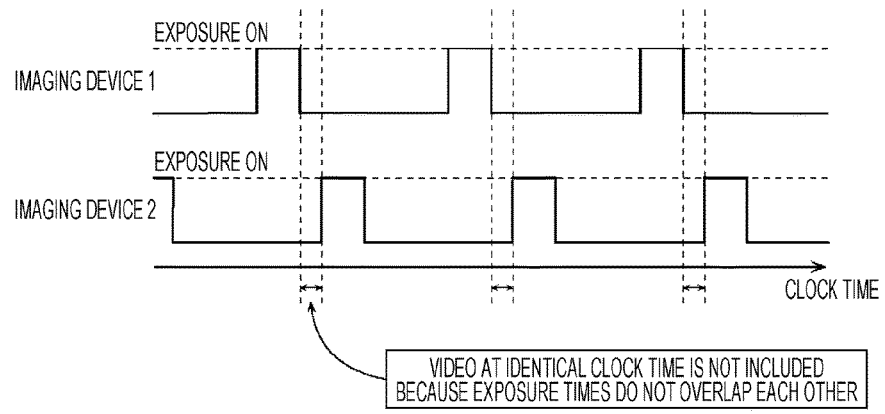
FIG. 1B is a view illustrating an example of non-synchronous imaging of the moving image.

FIGS. 1A and 1B are views illustrating examples of an imaging period and an exposure time of an imaging device. When an image is acquired with the imaging device, time during which a shutter is opened, namely, time during which exposure is performed is referred to as the exposure time. The image including a scene exposed to an imaging element through a lens during the exposure time is acquired in imaging. For example, in the imaging of the moving image, the exposure is repeated in each predetermined period, and the image is acquired in the exposure time during which the exposure is performed. As illustrated in FIG. 1A, imaging devices 1 and 2 overlap each other in an exposure time. Each of the images acquired with two imaging devices includes a scene at an identical clock time. On the other hand, in FIG. 1B, because exposure times of imaging devices 1 and 2 do not overlap each other, each of the images acquired with two imaging devices does not include the scene at the identical clock time. As illustrated in FIG. 1A, the acquisition of a plurality of images including the scene at the identical clock time through the imaging is referred to as synchronous imaging. On the other hand, as illustrated in FIG. 1B, the acquisition of a plurality of images not including the scene at the identical clock time through the imaging is referred to as non-synchronous imaging.

In the synchronous imaging, when a plurality of frames at the identical clock time are input even if a subject moves, the three-dimensional model can be restored by a method similar to the still image.

However, in performing the imaging with the plurality of imaging devices, sometimes there is the case that a time difference occurs in each imaging device when a trigger signal is received to open the shutter. Sometimes a delay occurs until the shutter is actually opened since the trigger signal is received, or the exposure times do not overlap each other because of a difference in exposure time. Even if the case that the exposure times do not overlap each other, namely, a deviation occurs in the imaging clock time, the three-dimensional model can be restored when the subject is a still body. On the other hand, when the subject is a moving body while the exposure times do not overlap each other, because the subject deviates in both time direction and a spatial direction in each image at a viewpoint, the images are hardly correlated with each other, and the high-accuracy three-dimensional model can hardly be restored. Thus, even in the technologies described in PTLS 1 to 3, it is difficult to easily restore the high-accuracy three-dimensional model.

Specifically, in the case that the subject that is a restoration target of the three-dimensional model moves, frame matching is hardly performed in the time-series image acquired with the monocular camera of PTL 1. In PTL 3, because the synchronous imaging is performed only in the calibration, it is difficult to estimate the high-accuracy three-dimensional position for the moving subject similarly to PTL 1. In PTL 2, there is a restriction to the camera position because of use of a stereo camera in which a positional relationship between two cameras is fixed.

In one general aspect, the techniques disclosed here feature image processing method including: acquiring an image taken with each of a plurality of imaging devices; acquiring an imaging clock time of each of a plurality of acquired images; and selecting the plurality of images, in which imaging clock times are substantially matched with each other, from the plurality of acquired images to generate an image set constructed with the plurality of selected images.

Therefore, the image set includes the plurality of images in which the imaging clock times are substantially matched with each other, so that the use of the image set can easily restore the high-accuracy three-dimensional model. As used herein, the term the imaging clock times are substantially matched with each other means that the imaging clock times are virtually matched with each other, and includes not only the strict matching of the imaging clock times with each other but also the art-effect matching of the imaging clock times with each other.

In the image processing method, three-dimensional information indicating three-dimensionally a state of at least one of the imaging device and subject corresponding to each of the plurality of images may be calculated based on the plurality of images included in the image set. For example, the three-dimensional information indicates at least one of a position and a posture of the imaging device corresponding to each of the plurality of images included in the image set as the state. The three-dimensional information indicates at least one of a position and a posture of the subject corresponding to each of the plurality of images included in the image set as the state.

Therefore, the plurality of images in which the imaging clock times are substantially matched with each other are used to calculate the three-dimensional information, so that the high-accuracy three-dimensional model can easily be calculated. That is, the high-accuracy three-dimensional model can easily be restored.

In generating the image set, a reference image that is one of the plurality of acquired images and at least one exposure overlapping image that is an image acquired by the imaging whose exposure overlaps imaging exposure of the reference image may be selected as the plurality of images in which the imaging clock times are substantially matched with each other.

The reference image and at least one exposure overlapping image whose exposure overlaps the exposure of the reference image are included in the image set. That is, the plurality of images in which the subject at the identical clock time is taken are included in the image set. Accordingly, the use of the image set can easily restore the higher-accuracy three-dimensional model.

In acquiring the imaging clock time, the imaging clock time of each of the plurality of images may be acquired, the imaging clock time being indicated with time accuracy higher than any other exposure time of the plurality of acquired images.

Therefore, the higher-accuracy three-dimensional model can easily be restored.

In acquiring the image, an image taken with each of the plurality of imaging devices may be acquired from the plurality of imaging devices, and in generating the image set, a plurality of image signals including the plurality of images, in which imaging clock times are substantially matched with each other, may be selected from the plurality of acquired image signals to generate the image set constructed with the plurality of selected image signals. For example, the image signal is moving image data including a plurality of images and clock time information acquiring an imaging clock time of each of the plurality of images, and in acquiring the imaging clock time, an imaging clock time of each of the plurality of images included in the image signal is acquired in each image signal based on the clock time information included in the image signal.

Therefore, the plurality of images (for example, the plurality of pictures or frames) included in the moving image data can easily be acquired based on the clock time information included in the moving image data. For example, the clock time information may indicate the imaging clock time and frame rate of the leading image of included in the moving image data, or indicate the imaging clock time of each of the plurality of images included in the moving image data.

The image signal may be image data including an image and clock time information acquiring an imaging clock time of the image, and in acquiring the imaging clock time, an imaging clock time of the image included in the image signal may be acquired in each image signal based on the clock time information included in the image signal.

Therefore, for example, the imaging clock time of the still image included in the image data can easily be acquired based on the clock time information included in the image data.

In generating the image set, an image of an area where a subject estimated to be at a standstill at a clock time different from an imaging clock time of an original image may be generated as a still image in which the clock time is set to the imaging clock time from the original image that is an image acquired from a processing target device that is one of the plurality of imaging devices, the still image being acquired from the processing target device, and the plurality of images in which imaging clock times are substantially matched with each other may be selected from a plurality of images that are acquired from the plurality of imaging devices including the generated still image.

Therefore, not only the image acquired actually from the imaging device but also the generated still image can be selected, and therefore the number of images in which the imaging clock times are substantially matched with each other can be increased, the images being included in the image set. Accordingly, the use of the image set can easily restore the high-accuracy three-dimensional model even if the number of images in which the imaging clock times are substantially matched with each other is decreased, the images being actually acquired from each of the plurality of imaging devices.

In generating the still image, at least one image acquired with the processing target device is compared to the original image in at least one of the clock times before and after the imaging clock time of the original image to specify the area from the original image. For example, in specifying the area, the area is specified in each processing unit constituting the original image by judging whether the processing unit corresponds to the area, and the processing unit is a block, an object block taken in the original image, or a sub-object indicated by dividing the object.

Therefore, the still image can properly be generated. Accordingly, the use of the image set including the still image can easily restore the higher-accuracy three-dimensional model.

In generating the image set, an interpolated image in which a clock time different from an imaging clock time of each of a plurality of reference images is set to an imaging clock time may be generated as an image acquired from a processing target device, which is one of the plurality of imaging devices, by interpolating the plurality of reference images that are a plurality of images acquired from the processing target device, and the plurality of images in which imaging clock times are substantially matched with each other may be selected from the plurality of images that are acquired from the plurality of imaging devices including the generated interpolated image. For example, in generating the interpolated image, the interpolated image is generated based on the uniform motion model.

Therefore, not only the image acquired actually from the imaging device but also the generated interpolated image can be selected, and therefore the number of images in which the imaging clock times are substantially matched with each other can be increased, the images being included in the image set. Accordingly, the use of the image set can easily restore the high-accuracy three-dimensional model even if the number of images in which the imaging clock times are substantially matched with each other is decreased, the images being actually acquired from each of the plurality of imaging devices.

In generating the interpolated image, the interpolation may be performed in each processing unit constituting each of the plurality of reference images, and the processing unit may be a block, an object taken in the plurality of reference images, or a sub-object indicated by dividing the object.

Therefore, the interpolated image can properly be generated. Accordingly, the use of the image set including the interpolated image can easily restore the higher-accuracy three-dimensional model.

Hereinafter, exemplary embodiments will be described in detail with reference to the drawings.

The following exemplary embodiments illustrate general or specific examples. The following numerical values, shapes, materials, constituents, displacement positions and a connection mode of the constituents, steps, and step order of the exemplary embodiments are illustrated only by way of example, but the present disclosure is not limited to the numerical values, shapes, materials, constituents, displacement positions and a connection mode of the constituents, steps, and step order. In the following constituents of the exemplary embodiments, the constituent that is not described in the independent claim indicating the highest concept is described as any constituent.

First Exemplary Embodiment

Figure 2:
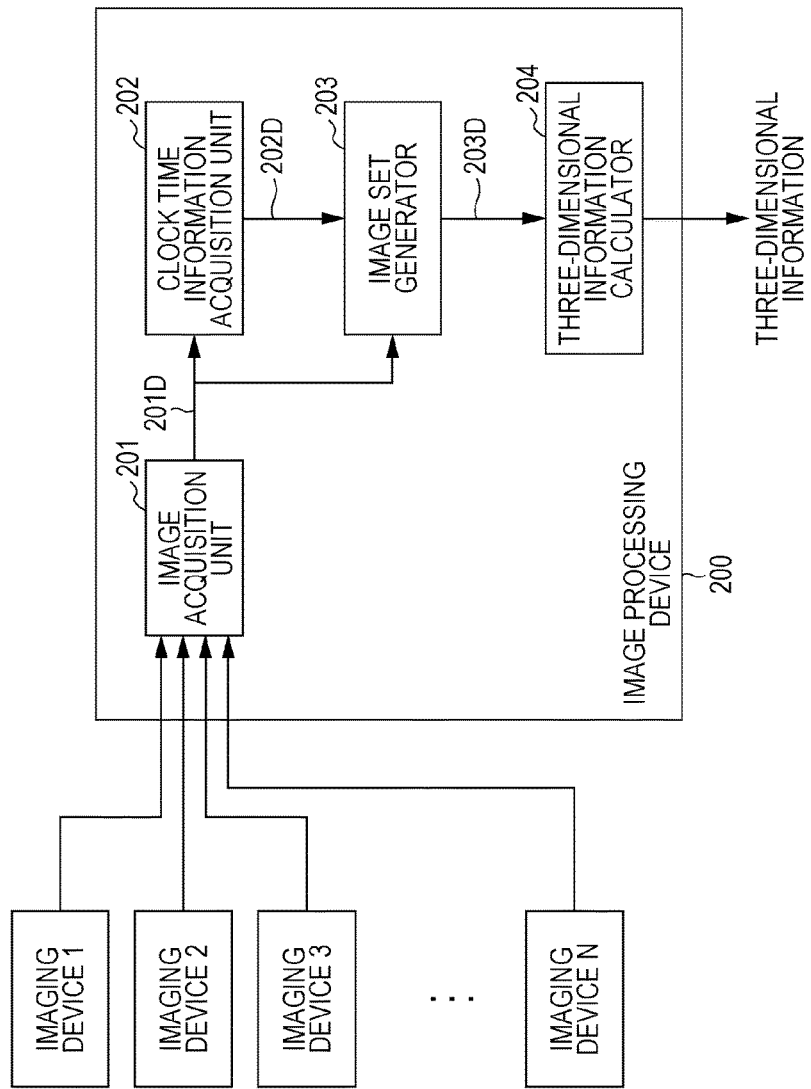
FIG. 2 is a block diagram illustrating a configuration of an image processing device according to a first exemplary embodiment.

FIG. 2 is a block diagram illustrating a configuration of image processing device 200 according to a first exemplary embodiment.

Image processing device 200 is a device or a system that acquires the images from the plurality of imaging devices to produce an image set constructed with the plurality of images in each of which the subject at the identical clock time is taken. Each of the plurality of imaging devices sends the image while the image is included in an image signal of image data. The image may be either a moving image or a still image. As illustrated in FIG. 2, image processing device 200 includes image acquisition unit 201, clock time information acquisition unit 202, image set generator 203, and three-dimensional information calculator 204.

Image acquisition unit 201 acquires the image from each of a plurality of imaging devices (imaging devices 1 to N). Each imaging device and image acquisition unit 201 may be connected to each other through a wired transmission line or a wireless transmission line. Each imaging device and image acquisition unit 201 may be connected to each other through a base station. For example, the imaging device sends the image to the base station in a wireless manner, and the base station sends the image to image acquisition unit 201 in a wireless manner. A format of the image sent from the imaging device may be a pre-development RAW image, an RGB uncompressed image such as a bitmap image in which the RAW image is developed, or a YUV uncompressed image into which the format of the RGB image is transformed. The format may be a coded stream in which the uncompressed image is coded by an image coding system such as H.265/HEVC and JPEG. The acquired image may be transformed into a format that is arbitrarily assigned to calculate the three-dimensional information. Therefore, image acquisition unit 201 may include an image development processor that develops the RAW image, an image transformer that transforms the RGB image into a YUV format, and an image decoder that decodes the coded stream. The image development processor, the image transformer, and the image decoder may be included in image processing device 200 while being independent of image acquisition unit 201. Image acquisition unit 201 outputs image data 201D, which is acquired from each of the plurality of imaging devices while including the image, to clock time information acquisition unit 202 and image set generator 203.

Clock time information acquisition unit 202 acquires the clock time the image is taken, namely, clock time information 202D indicating an imaging clock time of the image, from image data 201D output from image acquisition unit 201. Clock time information 202D indicates the imaging clock time having time accuracy finer than the exposure time (or higher time accuracy), and is set to each imaging device. For example, the imaging device performs the imaging in a period of about 33 milliseconds when acquiring the moving image having a frame rate of 30 fps (frame per second). In the imaging, the exposure time is set to 10 milliseconds. In this case, clock time information 202D indicates the imaging clock time with accuracy of 1 millisecond finer than 10 milliseconds such as 13:41:08.243. The imaging clock time may be an end point of the exposure time, namely, a point of time the shutter is closed, or a start point of the exposure time, namely, a point of time the shutter is opened. Hereinafter, for convenience, it is assumed that the imaging clock time is the end point of the exposure time.

The imaging clock time (or clock time information 202D) is added to image data 201D. Specifically, the imaging clock time may be added to a header portion of an image file, or retained in a head of each packet when image data 201D is sent as a transport stream while packetized. Alternatively, the imaging clock time may be retained in a Real-time Transport Protocol (RTP) packet. Alternatively, the imaging clock time may be retained in a user data unregistered SEI of the coded stream. Clock time information acquisition unit 202 acquires clock time information 202D from the header portion of the image file, the transport stream packet, or the decoded user data unregistered SEI, and outputs clock time information 202D to image set generator 203. As described above, the imaging clock time may be the information output from the imaging device or the clock time that is adjusted based on the clock time image processing device 200 receives the image.

For the moving image, in clock time information 202D acquired from image data 201D of the moving image data, only first-frame imaging start clock time included in the moving image data may be indicated, or the imaging clock time may be indicated in each frame. In the case that clock time information 202D indicates only the first-frame imaging start clock time, clock time information acquisition unit 202 further acquires a frame rate of the moving image, and calculates the imaging clock time of each frame subsequent to the first frame. Specifically, clock time information acquisition unit 202 adds time that is an integral multiple of an imaging period calculated from the frame rate to the first-frame imaging start clock time using $T(N)=Clip(T(1)+(1/F) \times (N-1))$.

Where N is a frame number in the moving image, $T(1)$ is the first-frame imaging start clock time, $T(N)$ is an Nth-frame imaging start clock time, F is the frame rate of the moving image, and Clip( ) is a function used to perform clip processing on the clock time with necessary time accuracy.

Image set generator 203 generates a set constructed with the plurality of images in which the imaging clock times are synchronized with each other as one image set 203D using acquired image data 201D and clock time information 202D, and outputs image set 203D to three-dimensional information calculator 204. That is, image set generator 203 selects the plurality of images in which the imaging clock times are substantially matched with each other from the plurality of acquired images, thereby generating image set 203D constructed with the plurality of selected images. In the plurality of images in which the imaging clock times are substantially matched with each other, the exposure times used to perform the imaging partially or wholly overlap each other. For example, the exposure time is 10 milliseconds.

Three-dimensional information calculator 204 calculates the three-dimensional information using acquired image set 203D, and outputs the three-dimensional information. As to an example of the three-dimensional information calculating method, three-dimensional information calculator 204 simultaneously restores a posture of the imaging device or the three-dimensional model of the subject using the SfM. Originally, in the SfM, the three-dimensional reconfiguration is performed from the plurality of time-series images that are acquired by taking a still scene of a certain object standing still while the viewpoint of one imaging device is changed. On the other hand, in the first exemplary embodiment, the three-dimensional reconfiguration can be performed at a certain clock time (time range) using the SfM from the plurality of images in which the imaging clock times of the subject are synchronized with each other, the plurality of images being acquired with the plurality of imaging devices.

Figure 3:
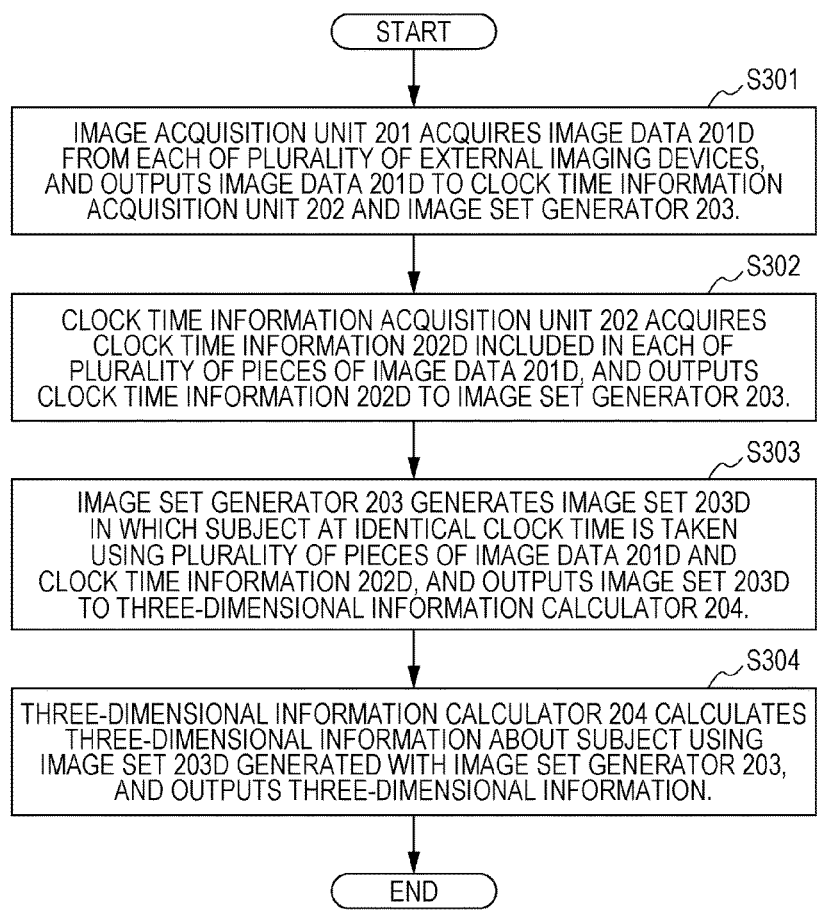
FIG. 3 is a flowchart illustrating an example of an image processing method of the first exemplary embodiment.

FIG. 3 is a flowchart illustrating an example of the image processing method of the first exemplary embodiment.

In step S301, image acquisition unit 201 acquires image data 201D from each of the plurality of external imaging devices, and outputs image data 201D to clock time information acquisition unit 202 and image set generator 203. For example, image data 201D includes the moving image.

In step S302, clock time information acquisition unit 202 acquires clock time information 202D included in each of the plurality of pieces of image data 201D, and outputs clock time information 202D to image set generator 203.

In step S303, image set generator 203 generates image set 203D constructed with the plurality of images in which the subject at the identical clock time is taken using the plurality of pieces of image data 201D and the plurality of pieces of clock time information 202D, and outputs image set 203D to three-dimensional information calculator 204. The identical clock time means that, for example, the exposure times during which each image is acquired partially or wholly overlap each other in a predetermined time range.

In step S304, three-dimensional information calculator 204 calculates the three-dimensional information about the subject using image set 203D generated with image set generator 203, and outputs the three-dimensional information.

The processing in step S303 will be described in detail with reference to FIG. 4.

FIG. 4 is a view illustrating an example of selection of at least two moving images, in which the imaging clock times are matched with each other, from N moving images acquired with N imaging devices. That is, FIG. 4 illustrates an example of the method for selecting the plurality of moving images acquired through the synchronous imaging. The maximum number of selected moving images may be N, a number required from three-dimensional information calculator 204, or an arbitrarily set number.

Image set generator 203 sets the exposure time of the imaging device to T milliseconds, and selects at least two moving images exposed from a clock time W:X:Y.Z to a clock time W:X:Y.(Z+T) as at least two moving images in which the imaging clock times are substantially matched with each other. That is, at least the two moving images are judged to be synchronous with each other, and included in image set 203D. The time period from the clock time W:X:Y.Z to the clock time W:X:Y.(Z+T) is referred to as a synchronous imaging time period.

As illustrated in FIG. 4, for example, the synchronous imaging time period is the exposure time of moving image 1 that is the exposure time of a certain reference imaging device selected from the plurality of imaging devices. The synchronous imaging time period exists in a period corresponding to the frame rate of the reference imaging device. In this case, image set generator 203 selects moving image 1 and moving images 2, 3, 5, . . . acquired by the imaging in the exposure time, which partially or wholly overlaps the exposure time of the reference imaging device that outputs moving image 1. In moving images 1, 2, 3, 5, . . . , M moving images acquired in a certain synchronous imaging time period are an image group in a certain time period (synchronous imaging time period) of image set 203D. The M moving images indicate the total number of moving images acquired during the overlapping exposure time in the N moving images. Image set generator 203 performs the above selection in the time period, thereby generating image set 203D constructed with the time-series data including the image group in each time period (synchronous imaging time period). Three-dimensional information calculator 204 can perform the three-dimensional reconfiguration using image set 203D.

At this point, when selecting the reference imaging device, image set generator 203 may select image quality such as resolution, small motion blur, and small coding distortion as an index, or perform randomly the selection. A fixed camera may be used as the reference imaging device.

The synchronous imaging time period may be any time period having an average time width of the exposure times of the plurality of imaging devices. In the example of FIG. 4, an average time between the exposure time of the imaging device that outputs moving image 4 in which the exposure time starts at the earliest clock time and the exposure time of the imaging device that outputs moving image 5 in which the exposure time starts at the latest clock time is set to the synchronous imaging time period. In this case, the images from more imaging devices can be included in one image set, there is a high possibility that the higher-accuracy three-dimensional model can be restored. In the case that the imaging clock times of the imaging devices disperse excessively, sometimes the synchronous imaging time period is improperly set. Therefore, image set generator 203 may judge whether the synchronous imaging time period setting method is adopted according to a difference in imaging clock time or exposure time.

The time width of the synchronous imaging time period is not limited to the exposure time of the imaging device, but may be any time width necessary to hold calculation accuracy of the three-dimensional information. For example, image set generator 203 generates image set 203D with the exposure time of the reference imaging device as the synchronous imaging time period. When the three-dimensional reconfiguration is performed based on generated image set 203D, image set generator 203 judges whether the accuracy of the three-dimensional model is less than or equal to a predetermined value because of a few images. When judging that the accuracy is less than or equal to the predetermined value, image set generator 203 may be used as a new synchronous imaging time period in which several milliseconds are added before and after the synchronous imaging time period, and generate image set 203D again. On the other hand, when judging that the correspondence between the images included in image set 203D is lowered because of the extremely long exposure time, image set generator 203 may set the time period in which several milliseconds are added before and after the synchronous imaging time period to a new synchronous imaging time period.

In the example of FIG. 4, moving images 1, 2, 3, 5, . . . are included in image set 203D. That is, moving images 1, 2, 3, and 5 are judged to be synchronous with one another. In other words, the judgement that moving images 1, 2, 3, and 5 are acquired by the synchronous imaging is made, and moving image 4 is judged to be non-synchronous.

As described above, image set 203D is constructed with the time-series data having the image group in each time period (synchronous imaging time period). Alternatively, image set 203D may be a set of frames extracted from each moving image in a certain synchronous imaging time period. That is, when comprehended while restricted to a certain clock time, image set 203D can be regarded as a set of the plurality of images acquired at the substantially identical clock time. On the other hand, when comprehended as the data having the time width, image set 203D can be regarded as a set of moving images. That is, at each clock time (synchronous imaging time period), the set of moving images has the plurality of images acquired at the substantially identical clock time.

In the case that image set 203D is the set of moving images, image set generator 203 generates an image set candidate constructed with the plurality of moving images based on the synchronous imaging time period. Then, image set generator 203 may select the plurality of moving images in which Group Of Pictures (GOP) structures of the coded streams are matched with each other from the image set candidate, and generate image set 203D constructed with the plurality of selected moving images. Image set generator 203 may generate image set 203D in an opposite procedure to the above procedure. For example, image set generator 203 removes the moving image having the GOP structure of IPBB from the moving images of the imaging devices, selects only the plurality of moving images of IPPP, and generate the image set candidate constructed with the plurality of moving images of IPPP. Then, image set generator 203 selects the moving image from the image set candidate based on the synchronous imaging time period, thereby generating image set 203D.

In the case that image set 203D is a set of frames (still images), image set generator 203 generates the image set candidate constructed with the plurality of frames based on the synchronous imaging time period. Then, image set generator 203 may select the plurality of frames in which picture types of the coded streams are matched with each other from the image set candidate, and generate image set 203D constructed with the plurality of selected frames. For example, the picture type is an I picture, a P picture, or a B picture. For example, image set generator 203 removes the P picture and the B picture from the image set candidate to select only a plurality of I pictures, and generates image set 203D constructed with the plurality of I pictures. Image set generator 203 may generate image set 203D in an opposite procedure to the above procedure. Specifically, image set generator 203 generates the image set candidate constructed with the plurality of frames in which the picture types are matched with each other. Then, image set generator 203 selects the plurality of frames from the image set candidate based on the synchronous imaging time period, and generates image set 203D constructed with the plurality of frames.

Image set generator 203 may select the moving image included in image set 203D based on the clock time image processing device 200 acquires the moving image from the imaging device. Specifically, image set generator 203 compares the clock time image processing device 200 acquires moving image X from the imaging device, namely, the clock time moving image X sent from the imaging device arrives at image processing device 200 to the clock time indicated by clock time information 202D. When a difference between the clock times is greater than or equal to an arbitrarily set time difference, image set generator 203 judges that clock time information 202D has low reliability, and removes moving image X corresponding to clock time information 202D from the selection of image set 203D.

Therefore, the image set constructed with the plurality of moving images or frames in which the subject imaging clock times are matched with each other is generated from the plurality of moving images acquired with the plurality of imaging devices. Accordingly, the posture of the imaging device or the three-dimensional model of the subject can be restored with high accuracy by calculating the three-dimensional information using the image set.

Thus, in the first exemplary embodiment, the image taken with each of the plurality of imaging devices 1 to N is acquired from the plurality of imaging devices 1 to N, and the imaging clock time of each of the plurality of acquired images is acquired. Then, the plurality of images in which the imaging clock times are substantially matched with each other are selected from the plurality of acquired images to generate image set 203D constructed with the plurality of selected images. In the first exemplary embodiment, the three-dimensional information indicating three-dimensionally a state of at least one of the imaging device and subject corresponding to each of the plurality of images is calculated based on the plurality of images included in image set 203D. Specifically, the three-dimensional information indicates at least one of the position and posture of the imaging device corresponding to each of the plurality of images included in image set 203D. Otherwise, the three-dimensional information indicates at least one of the position and shape of the subject corresponding to each of the plurality of images included in image set 203D.

Therefore, image set 203D includes the plurality of images in which the imaging clock times are substantially matched with each other, so that the use of image set 203D can easily restore the high-accuracy three-dimensional model.

In the first exemplary embodiment, as illustrated in FIG. 4, image set generator 203 selects the reference image (moving image 1) that is one of the plurality of acquired images and at least one exposure overlapping image (moving images 2, 3, and 5) that is the image acquired by the imaging whose exposure overlaps the imaging exposure of the reference image as the plurality of images in which the imaging clock times are substantially matched with each other.

The reference image and at least one exposure overlapping image whose exposure overlaps the exposure of the reference image are included in image set 203D. That is, the plurality of images in which the subject at the identical clock time is taken are included in image set 203D. Accordingly, the use of image set 203D can easily restore the higher-accuracy three-dimensional model.

In the first exemplary embodiment, clock time information acquisition unit 202 acquires the imaging clock time of each image indicated by time accuracy higher than any exposure time in the plurality of acquired images. Therefore, the higher-accuracy three-dimensional model can easily be restored.

In the first exemplary embodiment, image acquisition unit 201 acquires the image signal (that is, image data 201D) including the image taken with each of the plurality of imaging devices 1 to N from the plurality of imaging devices 1 to N. Image set generator 203 selects the plurality of image signals including the plurality of images in which the imaging clock times are substantially matched with each other from the plurality of acquired image signals, thereby generating image set 203D constructed with the plurality of selected image signals. Specifically, the image signal is moving image data including the plurality of images (for example, the plurality of pictures or frames) and clock time information 202D used to acquire the imaging clock time of each of the plurality of images. In each image signal, namely, each piece of moving image data, clock time information acquisition unit 202 acquires the imaging clock time of each of the plurality of images included in the image signal based on clock time information 202D included in the image signal.

Therefore, the plurality of images (for example, the plurality of pictures or frames) included in the moving image data can easily be acquired based on the clock time information included in the moving image data. For example, the clock time information may indicate the imaging clock time and frame rate of the leading image included in the moving image data, or indicate the imaging clock time of each of the plurality of images included in the moving image data.

The image signal may be image data 201D including the image and the clock time information acquiring the imaging clock time of the image. In this case, the image is the still image or the frame, and image data 201D is the still image data. In this case, clock time information acquisition unit 202 also acquires the imaging clock time of the image included in the image signal based on the clock time information included in the image signal. Therefore, for example, the imaging clock time of the still image included in image data 201D can easily be acquired based on the clock time information included in image data 201D.

(Variation 1)

At this point, when only the image (the moving image or the frame) acquired by the synchronous imaging is selected, the number of images included in image set 203D decreases, sometimes the number of images necessary for the calculation of the three-dimensional information, namely, an input data amount is insufficient.

Therefore, in variation 1, a new image is generated as an image acquired by synchronous imaging.

Figure 5A:
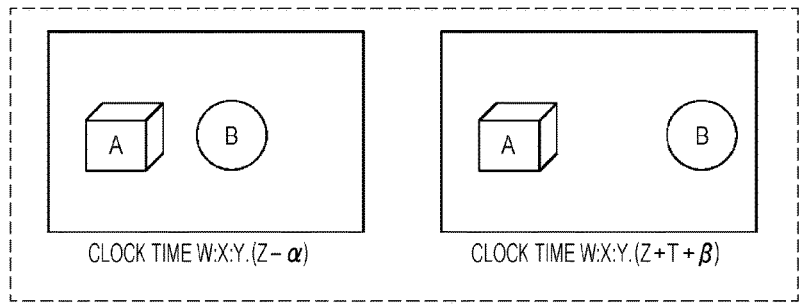
FIG. 5A is a view illustrating an example of images included in the moving image, and of images at imaging clock times before and after a synchronous imaging time period in the first exemplary embodiment.

FIG. 5A is a view illustrating an example of images included in moving image 4 determined to be non-synchronous in FIG. 4, and of images at imaging clock times before and after a synchronous imaging time period.

The imaging clock time of one of two frames (images) is a clock time before the synchronous imaging time period, and is clock time W:X:Y.(Z–α) (Z–α<Z). On the other hand, the imaging clock time of the other frame is a clock time after the synchronous imaging time period, and is clock time W:X:Y.(Z+T+β) (Z+T+β>Z+T). Accordingly, in the selection based on the synchronous imaging time period, these two frames are not included in image set 203D. However, because the frames are identical to each other in the position, size, shape of body A, body A stands still between the imaging clock times of the two frames. That is, when the imaging is performed in the synchronous imaging time period, it can be estimated that body A is also taken in the frame acquired by the imaging with the position, size, shape identical to those of body A taken in the two frames.

Figure 5B:
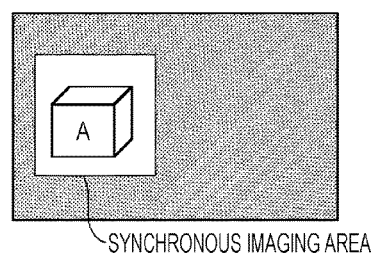
FIG. 5B is a view illustrating an area of a subject that stands still between two frames in the first exemplary embodiment.

FIG. 5B is a view illustrating an area of the subject that stands still between two frames.

For example, as illustrated in FIG. 5B, image set generator 203 specifies an area (hereinafter, referred to as a synchronous imaging area or a still area) where the still subject is taken from one of the two frames in FIG. 5A, and generates the image in the area as the still image acquired by the imaging in the synchronous imaging time period. Image set generator 203 generates image set 203D from the plurality of images acquired with image acquisition unit 201 and the generated still image.

Specifically, image set generator 203 specifies the still area (synchronous imaging area) from each of the N moving images acquired from the N imaging devices, and judges whether the subject in the still area stands still even in the synchronous imaging time period. Image set generator 203 extracts the image (still image) in the still area where the judgement that the subject in the still area stands still is made, and includes the still image in image set 203D.

Image set generator 203 may specify the area where the subject stands completely still as the still area, or specify the area where the subject moves with a motion amount within an allowable range as the still area. The motion amount within the allowable range may be an arbitrarily assigned motion amount or a motion amount assigned with three-dimensional information calculator 204. The motion vector acquired by decoding the coded stream using image acquisition unit 201 may be used as the motion amount.

The still image in the non-synchronous moving image may be added to image set 203D constructed only with the plurality of images acquired by the synchronous imaging.

As to a specific method, image set generator 203 selects K moving images acquired by the imaging in the synchronous imaging time period from the N moving images acquired with the N imaging devices, and includes the K moving images in image set 203D. Image set generator 203 specifies a predetermined frame from the plurality of frames included in the moving image in each of the remaining (N–K) moving images. The predetermined frame is a frame in which the clock time near the synchronous imaging time period within the imaging period is set to the imaging clock time. Then, image set generator 203 specifies the still area from the predetermined frame to judge whether the subject in the still area stands still even in the synchronous imaging time period. When judging that the subject in the still area stands still even in the synchronous imaging time period, image set generator 203 adds the image in the still area to image set 203D as the still image.

Therefore, even if a small number of images are acquired by the synchronous imaging, the image of the still area where image quality is easily visible or the area of the small motion amount is extracted from the non-synchronous moving image, and the image can be used to calculate the three-dimensional information. Accordingly, a shortage of information due to synchronization deviation can be improved in the calculation of the three-dimensional information.

In the variation 1, image set generator 203 further generates the image of the area, where the subject estimated to be at a standstill at the clock time different from the imaging clock time of the original image, from the original image that is the image acquired from the processing target device that is one of the plurality of imaging devices as the still image, which is acquired from the processing target device while the different clock time is set to the imaging clock time. Image set generator 203 selects the plurality of images in which the imaging clock times are substantially matched with each other from the plurality of images, which are acquired from the plurality of imaging devices while including the generated still image.

Therefore, not only the image acquired actually from the imaging device but also the generated still image can be selected, and therefore the number of images in which the imaging clock times are substantially matched with each other can be increased, the images being included in image set 203D. Accordingly, the use of image set 203D can easily restore the high-accuracy three-dimensional model even if the number of images in which the imaging clock times are substantially matched with each other is decreased, the images being actually acquired from each of the plurality of imaging devices.

In the variation 1, image set generator 203 compares at least one image acquired with the processing target device to its original image in at least one of the clock times before and after the imaging clock time of the original image, thereby specifying the area (that is, the synchronous imaging area or the still area) from the original image. At this point, image set generator 203 specifies the area in each processing unit constituting the original image by judging whether the processing unit corresponds to the area. The processing unit means a block, an object taken in the original image, or a sub-object indicated by dividing the object.

Therefore, the still image can properly be generated. Accordingly, the use of image set 203D including the still image can easily restore the higher-accuracy three-dimensional model.

(Variation 2)

In the selection of the moving image or image or the extraction of the still image, sometimes the input data amount is insufficient due to the small number of imaging devices during the calculation of the three-dimensional information.

In variation 2, each moving image performs the frame interpolation to generate a new image (interpolated frame), and the new image is included in image set 203D.

As to a specific method, image set generator 203 selects K moving images acquired by the imaging in the synchronous imaging time period from the N moving images acquired with the N imaging devices, and includes the K moving images in image set 203D. Image set generator 203 generates a new frame in the synchronous imaging time period as the interpolated frame by performing the frame interpolation in each of the remaining (N−K) moving images, and adds the new frame to the image set 203D.

In performing the frame interpolation, the motion amount may linearly be interpolated on the assumption that the subject performs the uniform motion between the frames before and after the synchronous imaging time period.

A specific method will be described with reference to FIGS. 6 and 7.

Figure 6:
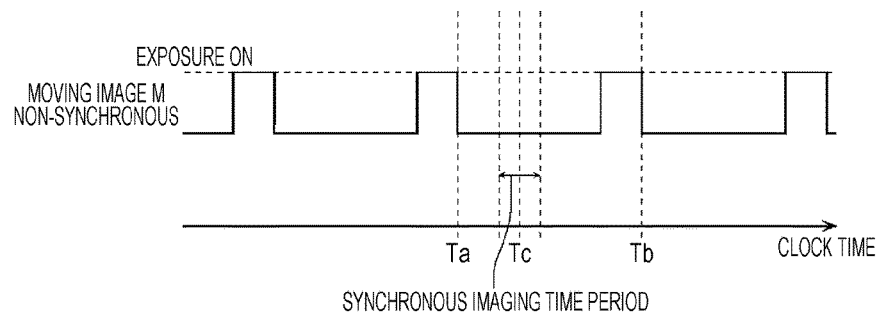
FIG. 6 is a view illustrating a clock time of an interpolated frame and a clock time of a frame used in interpolation in the first exemplary embodiment.

FIG. 6 is a view illustrating the clock time of the interpolated frame in moving image M and the clock time of the frame used in the interpolation. For convenience, clock time Tc of the interpolated frame is set to a center of the synchronous imaging time period. Alternatively, clock time Tc may be set to any clock time in the synchronous imaging time period. The frames at imaging clock times Ta and Tb before and after the synchronous imaging time period are used in the interpolation.

Figure 7:
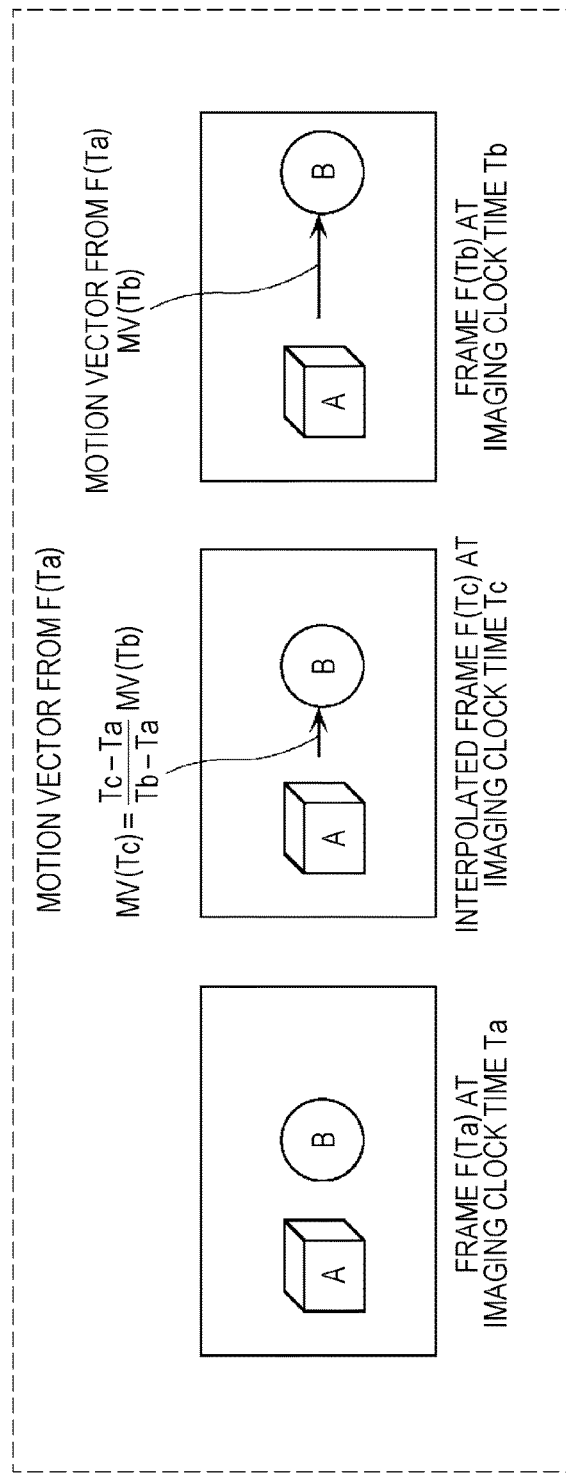
FIG. 7 is a view illustrating an example of the interpolated frame, the frames before and after the interpolated frame, and motion vectors when frame interpolation is performed based on a uniform motion model in the first exemplary embodiment.

FIG. 7 is a view illustrating frames at clock times Ta, Tb, Tc and a motion vector of a moving body. In FIG. 7, it is assumed that body A taken in each frame is the still body, and that body B is the moving body.

Image set generator 203 calculates motion vector MV(Tb) of body B in frame F(Tb) from frames F(Ta) and F(Tb) included in moving image M. In frame F(Ta), clock time Ta is set to the imaging clock time. In frame F(Tb), clock time Tb is set to the imaging clock time.

Image set generator 203 may divide frame F(Tb) into a plurality of blocks, and calculate the motion vector in each block. Image set generator 203 may extract the object in frame F(Tb), and calculate the motion vector in each extracted object. Image set generator 203 may divide the block into finer sub-blocks, and calculate the motion vector in each sub-block. Image set generator 203 may divide the object into a plurality of finer sub-objects, and calculate the motion vector in each sub-object.

In this case, the motion vector is calculated only with respect to a moving area (that is, an area where the moving object is taken) such as body B. Alternatively, irrespective of the motion of the area, the motion vector may be calculated with respect to the whole frame.

In the case that moving image M is input to image processing device 200 as the coded stream, image set generator 203 may use the block-unit motion vector acquired in the decoding as the motion vector of body B.

Then, it is assumed that the moving body performs the uniform motion between frames F(Ta) and F(Tb). Accordingly, image set generator 203 calculates motion vector MV(Tc) of body B in frame F(Tc) based on (equation 1). Frame F(Tc) is an interpolated frame in which clock time Tc is set to the imaging clock time.

[Mathematical formula 1]

$$MV(Tc) = \frac{Tc - Ta}{Tb - Ta} MV(Tb) \qquad (式1)$$

Then, image set generator 203 performs motion compensation based on the motion vector and frame F(Ta), thereby generating frame F(Tc). Image set generator 203 may perform the motion compensation in units of blocks or units of objects.

At this point, in performing the frame interpolation, the motion amount may be interpolated on the assumption that the subject performs uniformly accelerated motion between the frames before and after the synchronous imaging time period.

A specific method will be described with reference to FIGS. 8 and 9.

Figure 8:
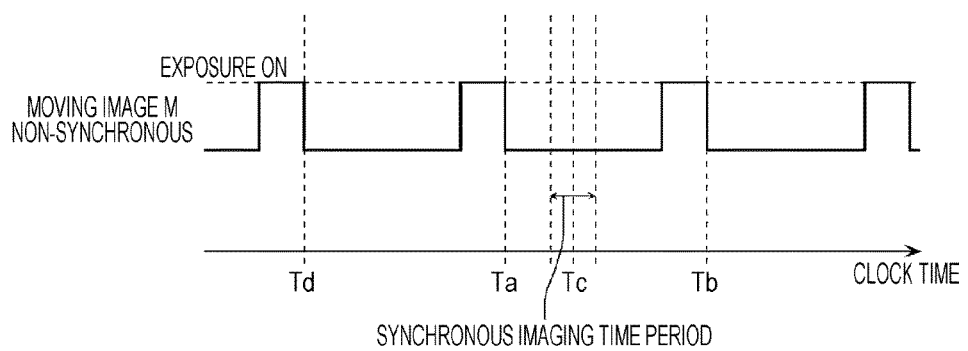
FIG. 8 is a view illustrating the clock time of the interpolated frame and the clock time of the frame used in the interpolation in the first exemplary embodiment.

FIG. 8 is a view illustrating the clock time of the interpolated frame in moving image M and the clock time of the frame used in the interpolation. For convenience, clock time Tc of the interpolated frame is set to the center of the synchronous imaging time period. Alternatively, clock time Tc may be set to any clock time in the synchronous imaging time period. The frames at imaging clock times Ta, Tb, and Td before and after the synchronous imaging time period are used in the interpolation.

Imaging clock time Td is a preceding imaging clock time of imaging clock time Ta. Alternatively, imaging clock time Td may be an imaging clock time subsequent to imaging clock time Tb. Alternatively, imaging clock time Td may be a preceding imaging clock time of a plurality of frames at imaging clock time Ta, or an imaging clock time subsequent to the plurality of frames at imaging clock time Tb.

Figure 9:
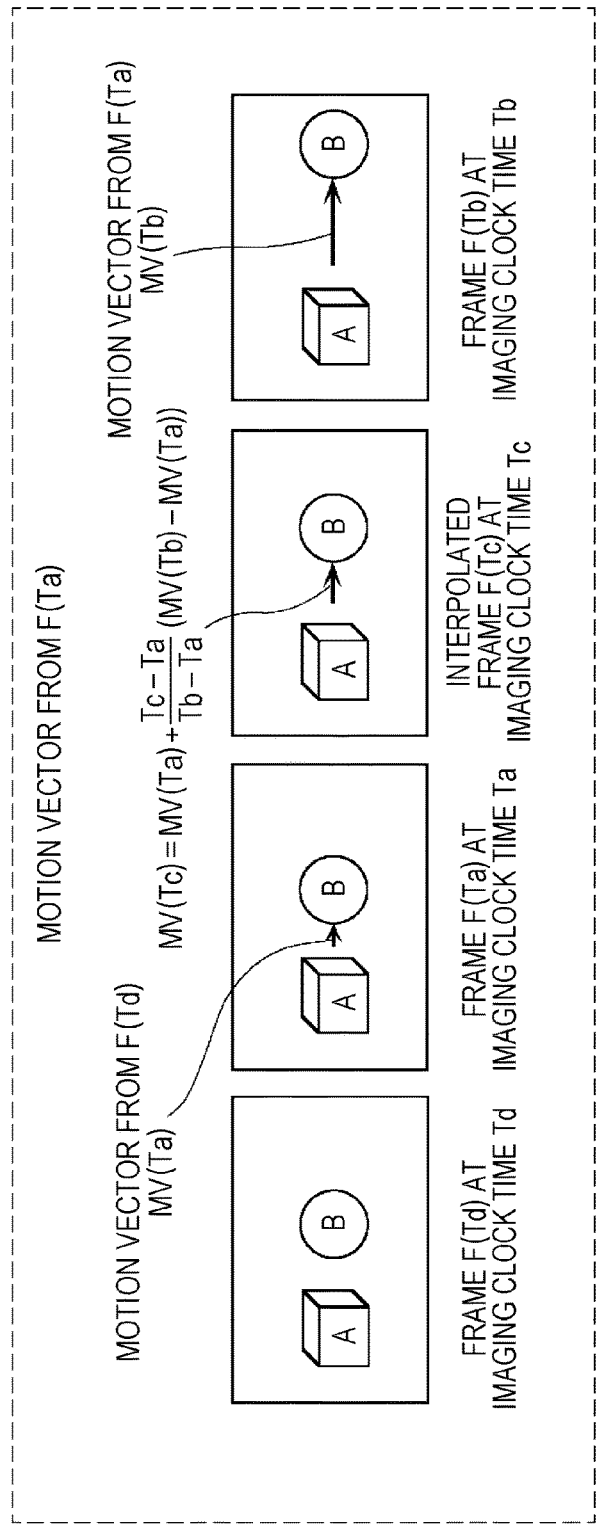
FIG. 9 is a view illustrating an example of the interpolated frame, the frames before and after the interpolated frame, and motion vectors when frame interpolation is performed based on a uniformly accelerated motion model in the first exemplary embodiment.

FIG. 9 is a view illustrating the frames at clock times Ta, Tb, Tc, Td and the motion vector of the moving body. In FIG. 9, it is assumed that body A taken in each frame is the still body, and that body B is the moving body.

Image set generator 203 calculates motion vector MV(Ta) of body B in frame F(Ta) from frames F(Td) and F(Ta) included in moving image M. Frame F(Td) is a frame in which clock time Td is set to the imaging clock time. Image set generator 203 calculates motion vector MV(Tb) of body B in frame F(Tb) from frames F(Ta) and F(Tb). Image set generator 203 may calculate the motion vector in each processing unit (such as the block) similarly to the uniform motion.

Image set generator 203 approximately obtains acceleration of body B between frames (Ta) and (Tb) by calculating a difference between two motion vectors MV(Ta) and MV(Tb). At this point, it is assumed that the moving body performs the uniformly accelerated motion between frames F(Ta) and F(Tb). Accordingly, image set generator 203 calculates motion vector MV(Tc) of body B in frame F(Tc) based on (equation 2).

[Mathematical formula 2]

$$MV(Tc) = MV(Ta) + \frac{Tc - Ta}{Tb - Ta}(MV(Tb) - MV(Ta)) \qquad (式2)$$

Then, image set generator 203 performs the motion compensation based on the motion vector and frame F(Ta), thereby generating frame F(Tc) as the interpolated frame.

Image set generator 203 may perform the motion compensation in a processing unit (such as the block) similar to the uniform motion.

By way of example, the motion vector is calculated based on frame F(Ta). Alternatively, based on frame F(Td), frame F(Td) may be used in the motion compensation.

Thus, in the variation 2, image set generator 203 further interpolates the plurality of reference images (for example, frame F(Ta) or F(Tb)), which are the plurality of images acquired from the processing target device that is one of the plurality of imaging devices 1 to N, and generates the interpolated image (for example, interpolated frame F(Tc)) in which the clock time (for example, clock time Tc) different from the imaging clock time of each of the plurality of reference images is set to the imaging clock time as the image acquired from the processing target device. Image set generator 203 selects the plurality of images in which the imaging clock times are substantially matched with each other from the plurality of images, which are acquired from the plurality of imaging devices 1 to N while including the generated interpolated image. At this point, image set generator 203 generates the interpolated image based on the uniform motion model or uniformly accelerated motion model.

Therefore, not only the image acquired actually from the imaging device but also the generated interpolated image can be selected, and therefore the number of images in which the imaging clock times are substantially matched with each other can be increased, the images being included in image set 203D. Accordingly, the use of image set 203D can easily restore the high-accuracy three-dimensional model even if the number of images in which the imaging clock times are substantially matched with each other is decreased, the images being actually acquired from each of the plurality of imaging devices.

That is, the three-dimensional information is calculated using image set 203D including the sufficient number of images in which the clock times at which the subject is imaged are matched with each other, so that the accuracy of the three-dimensional information such as the posture of the imaging device and the three-dimensional model of the subject can be improved.

In the variation 2, image set generator 203 performs the interpolation in each processing unit constituting each of the plurality of reference images. The processing unit means a block, an object taken in each of the plurality of reference images, or a sub-object indicated by dividing the object.

Therefore, the interpolated image can properly be generated. Accordingly, the use of the image set including the interpolated image can easily restore the higher-accuracy three-dimensional model.

Although the image processing method according to one of aspects of the present disclosure is described above based on the first exemplary embodiment and its variations, the present disclosure is not limited to the first exemplary embodiment and its variations. Various modifications can be made by those skilled in the art without departing from the scope of the present disclosure, and an aspect constructed by a combination of the constituents of the first exemplary embodiment and its variations may also be included in the present disclosure. For example, a method and a system in FIGS. 10A and 10B are also included in the present disclosure.

Figure 10A:
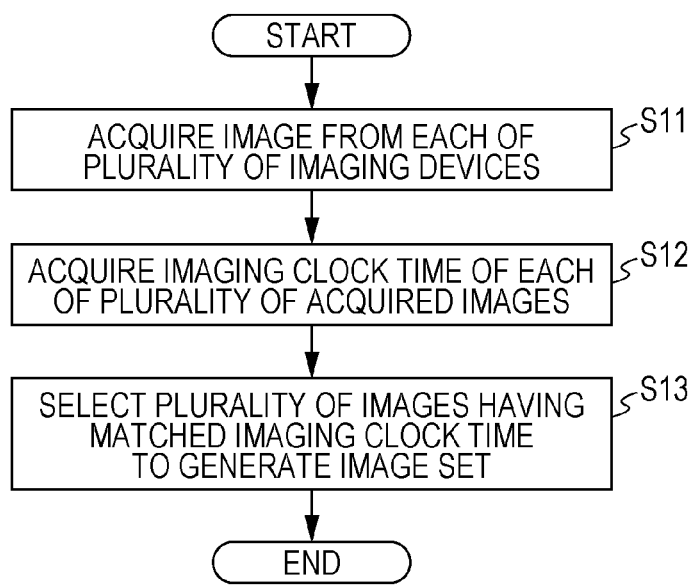
FIG. 10A is a flowchart illustrating an image processing method according to one aspect of the present disclosure.

FIG. 10A is a flowchart illustrating an image processing method according to one aspect of the present disclosure.

The image processing method for processing a plurality of images, the image processing method includes: step S11 of acquiring an image taken with each of a plurality of imaging devices; step S12 of acquiring an imaging clock time of each of a plurality of acquired images; and step S13 of selecting the plurality of images, in which imaging clock times are substantially matched with each other, from the plurality of acquired images to generate the image set constructed with the plurality of selected images.

Figure 10B:
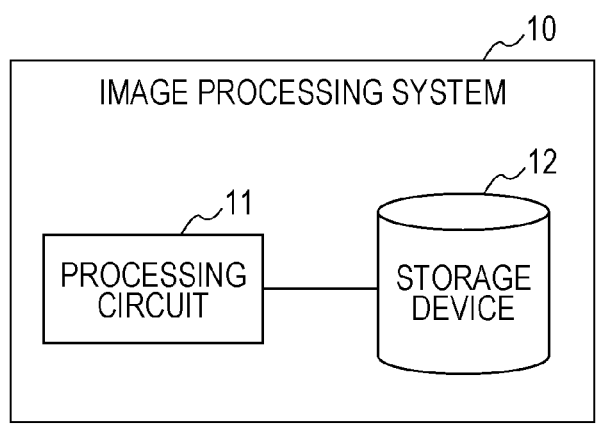
FIG. 10B is a block diagram illustrating an image processing system according to one aspect of the present disclosure.

FIG. 10B is a block diagram illustrating an image processing system according to one aspect of the present disclosure.

Image processing system 10 includes processing circuit 11 and storage device 12 connected to processing circuit 11. Processing circuit 11 acquires an image taken with each of a plurality of imaging devices to store the image in storage device 12, acquires an imaging clock time of each of a plurality of acquired images; and selects the plurality of images, in which imaging clock times are substantially matched with each other, from the plurality of images stored in storage device 12 to generate an image set constructed with the plurality of selected images.

Even the image processing method in FIG. 10A or image processing system 10 in FIG. 10B, the effect similar to the first exemplary embodiment and its variations can be obtained. That is, the image set includes the plurality of images in which the imaging clock times are substantially matched with each other, so that the use of the image set can easily restore the high-accuracy three-dimensional model. Three-dimensional information calculator 204 in FIG. 2 is not always necessary in the present disclosure.

In each of the first exemplary embodiment and its variations, each constituent may be constructed with dedicated hardware or implemented by executing a software program suitable for each constituent. A program executing unit such as a CPU and a processor reads and executes the software program stored in a hard disk drive or a recording medium such as a semiconductor memory, whereby each constituent may be implemented. At this point, the software implementing the image processing device or image processing system of the first exemplary embodiment and its variations is a program that causes a computer to execute each step in FIG. 10A.

The following cases are also included in the present disclosure.

(1) Specifically, each device is a computer system including a microprocessor, a ROM, a RAM, a hard disk unit, a display unit, a keyboard, a mouse, and the like. A computer program is stored in the RAM or the hard disk unit. The microprocessor is operated according to the computer program, whereby each device implements its function. At this point, in the computer program, a plurality of command codes indicating an instruction issued to the computer are combined in order to achieve a predetermined function.

(2) Some of or all the constituents constituting each device may be constructed with one system Large Scale Integration (LSI). The system LSI is a super-multifunctional LSI that is manufactured by integrating a plurality of components on one chip. Specifically, the system LSI is a computer system including a microprocessor, a ROM, and a RAM. The computer program is stored in the RAM. The microprocessor is operated according to the computer program, whereby the system LSI implements its function.

(3) Some of or all the constituents constituting each device may be constructed with an IC card detachably attached to each device or a single module. The IC card or the module is a computer system including a microprocessor, a ROM, and a RAM. The IC card or the module may include the super-multifunctional LSI. The microprocessor is operated according to the computer program, whereby the IC card or the module implements its function. The IC card or the module may have a tamper-resistance.

(4) The present disclosure may be the above methods. The present disclosure may be a computer program in which these methods are performed by the computer or a digital signal constructed with the computer program.

In the present disclosure, the computer program or the digital signal may be recorded in a computer-readable recording medium such as a flexible disk, a hard disk, a CD-ROM, an MO, a DVD, a DVD-ROM, a DVD-RAM, a Blu-ray Disc (BD), and a semiconductor memory. The present disclosure may be the digital signal recorded in these recording mediums.

In the present disclosure, the computer program or the digital signal may be transmitted through an electric communication line, a wireless or wired communication line, a network typified by the Internet, data broadcasting, and the like.

The present disclosure may be a computer system including a microprocessor and a memory, the computer program is stored in the memory, and the microprocessor is operated according to the computer program.

Alternatively, the program or the digital signal is transported while recorded in the recording medium, or the program or the digital signal is transported through the network and the like, which may allow the present disclosure to be implemented with another independent computer system.

(5) The first exemplary embodiment and the variations may be combined.

Second Exemplary Embodiment

Other application examples of the configurations of the image processing method and apparatus described in each exemplary embodiment described above and a system using the application examples will be described. The system is applicable to an increasingly intelligent video system with object space extending to a wider area. For example, the system is applicable to (1) a monitoring system mounted in a security camera of a store or a factory, a vehicle-mounted camera of the police or the like, (2) a transportation information system using a camera owned by an individual person, each vehicle-mounted camera, a camera installed in a road or the like, (3) an environmental research or delivery system using a remote-controllable or auto-controllable apparatus such as a drone, and (4) a content transmission and reception system of a video or the like using a camera installed in an entertainment facility, a stadium or the like, a moving camera such as a drone, a camera owned by an individual person or the like.

Figure 11:
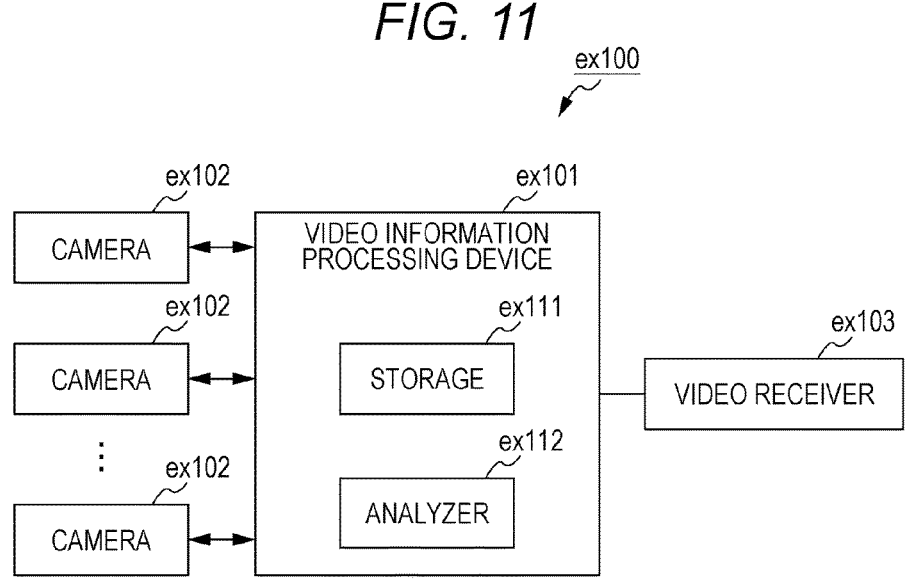
FIG. 11 is a diagram illustrating a configuration of a video information processing system.

FIG. 11 is a diagram illustrating a configuration of video information processing system ex100 according to the present exemplary embodiment. The present exemplary embodiment describes an example of preventing occurrence of a dead angle and an example of prohibiting capturing of a specific area.

Video information processing system ex100 illustrated in FIG. 11 includes video information processing apparatus ex101, a plurality of cameras ex102, and video reception apparatus ex103. Note that video information processing system ex100 does not necessarily need to include video reception apparatus ex103.

Video information processing apparatus ex101 includes storage ex111 and analyzer ex112. Each of N cameras ex102 has a function of capturing videos and a function of transmitting captured video data to video information processing apparatus ex101. Moreover, camera ex102 may have a function of displaying a video that is being captured. Note that camera ex102 may code a captured video signal by using a coding scheme such as HEVC or H.264, and may then transmit the coded video signal to video information processing apparatus ex101, or camera ex102 may transmit the video data that is not coded to video information processing apparatus ex101.

Here, each camera ex102 is a fixed camera such as a monitoring camera, a moving camera mounted in a radio-controlled unmanned flight vehicle, a vehicle or the like, or a user camera owned by a user.

The moving camera receives an instruction signal transmitted from video information processing apparatus ex101, and changes a position or capturing direction of the moving camera itself in response to the received instruction signal.

Moreover, time of the plurality of cameras ex102 is calibrated by using time information of a server or a reference camera prior to start of capturing. Moreover, spatial positions of the plurality of cameras ex102 are calibrated based on how an object in space to be captured is captured or a relative position from a reference camera.

Storage ex111 in information processing apparatus ex101 stores the video data transmitted from N cameras ex102.

Analyzer ex112 detects a dead angle from the video data stored in storage ex111, and transmits to the moving camera the instruction signal that indicates an instruction to the moving camera for preventing occurrence of a dead angle. The moving camera moves in response to the instruction signal, and continues capturing.

Analyzer ex112 detects a dead angle by using Structure from Motion (SfM), for example. SfM is a technique of restoring a three-dimensional shape of a subject from a plurality of videos captured from different positions, and SfM is widely known as a shape restoration technology of estimating a subject shape and a camera position simultaneously. For example, analyzer ex112 restores the three-dimensional shape in the facility or in the stadium from the video data stored in storage ex111 by using SfM, and detects as a dead angle an area that cannot be restored.

Note that when the position and capturing direction of camera ex102 are fixed and information of the position and capturing direction is known, analyzer ex112 may perform SfM by using these pieces of known information. Moreover, when the position and capturing direction of the moving camera can be acquired with, for example, a GPS and angle sensor in the moving camera, the moving camera may transmit information of the position and capturing direction of the moving camera to analyzer ex112, and analyzer ex112 may perform SfM by using the transmitted information of the position and the capturing direction.

Note that a method for detecting a dead angle is not limited to the above-described method using SfM. For example, analyzer ex112 may use information from a depth sensor such as a laser range finder, to know a spatial distance of the object to be captured. Moreover, when an image includes a marker that is set in space in advance or a specific object, analyzer ex112 may detect information of the camera position, capturing direction, and zoom magnification from the size of the marker or the object. Thus, analyzer ex112 detects a dead angle by using any method that enables detection of the capturing area of each camera. Moreover, analyzer ex112 may acquire, for example, information of a mutual positional relationship between a plurality of objects to be captured, from video data or a proximity sensor, and analyzer ex112 may identify an area where a dead angle is highly likely to occur, based on the acquired positional relationship.

Here, the dead angle includes not only a portion having no video in an area to be captured but also a portion having poor image quality as compared to other portions, and a portion having no predetermined image quality. This portion to be detected may be set appropriately according to the configuration or purpose of the system. For example, required image quality of a specific subject in space to be captured may be set high. Moreover, conversely, the required image quality of a specific area in space to be captured may be set low, and the required image quality may be set such that the area is not determined to be a dead angle even when no video is captured.

Note that the above-described image quality includes various pieces of information regarding a video, such as area occupied by a subject to be captured in the video (for example, a number of pixels), or whether the video is focused on the subject to be captured. Based on these pieces of information or combination thereof, whether the area is a dead angle may be determined.

Note that detection of the area that is actually a dead angle is described above, but the area that needs to be detected in order to prevent occurrence of a dead angle is not limited to the area that is actually a dead angle. For example, when a plurality of objects to be captured exists and at least part of the objects is moving, a new dead angle is likely to occur because another object to be captured enters between a certain object to be captured and a camera. Meanwhile, analyzer ex112 may detect movement of the plurality of objects to be captured from, for example, the captured video data, and analyzer ex112 may estimate the area that is likely to become a new dead angle, based on the detected movement of the plurality of objects to be captured and positional information of camera ex102. In this case, video information processing apparatus ex101 may transmit the instruction signal to the moving camera to capture the area that is likely to become a dead angle, and video information processing apparatus ex101 may prevent occurrence of a dead angle.

Note that when there is a plurality of moving cameras, video information processing apparatus ex101 needs to select any of the moving cameras to which the instruction signal is to be transmitted in order to cause the moving camera to capture a dead angle or an area that is likely to become a dead angle. Moreover, when there is a plurality of moving cameras and there is a plurality of dead angles or areas that are likely to become dead angles, video information processing apparatus ex101 needs to determine which dead angle or area that is likely to become a dead angle each of the plurality of moving cameras is to capture. For example, video information processing apparatus ex101 selects the moving camera closest to a dead angle or an area that is likely to become a dead angle, based on a position of a dead angle or an area that is likely to become a dead angle, and a position of an area each moving camera is capturing. Moreover, video information processing apparatus ex101 may determine for each camera whether a new dead angle occurs when video data which the moving camera is currently capturing is not obtained, and video information processing apparatus ex101 may select the moving camera that is determined that a dead angle does not occur even when the video data which is currently being captured is not obtained.

The above-described configuration enables video information processing apparatus ex101 to prevent occurrence of a dead angle by detecting a dead angle and transmitting the instruction signal to the moving camera so as to prevent the dead angle.

Variation 1

Note that the example of transmitting the instruction signal for instructing the moving camera to move is described above; however, the instruction signal may be a signal for instructing the user of the user camera to move. For example, the user camera displays an instruction image that instructs the user to change the direction of the camera, based on the instruction signal. Note that the user camera may display the instruction image that indicates a movement path on a map, as the user movement instruction. Moreover, in order to improve the quality of the acquired image, the user camera may display detailed capturing instructions such as the capturing direction, an angle, an angle of view, image quality, and movement of the capturing area. Further, video information processing apparatus ex101 may automatically control such feature data of camera ex102 regarding capturing when the feature data is controllable on a video information processing apparatus ex101 side.

Here, the user camera is, for example, a smartphone, a tablet terminal, a wearable terminal, or a head mounted display (HMD) that a spectator in the stadium or a guard in the facility carries.

Moreover, a display terminal that displays the instruction image does not need to be identical to the user camera that captures video data. For example, the user camera may transmit the instruction signal or the instruction image to the display terminal associated with the user camera in advance, and the display terminal may display the instruction image. Moreover, information of the display terminal corresponding to the user camera may be registered in video information processing apparatus ex101 in advance. In this case, video information processing apparatus ex101 may cause the display terminal to display the instruction image by transmitting the instruction signal directly to the display terminal corresponding to the user camera.

Variation 2

Analyzer ex112 may generate a free viewpoint video (three-dimensional reconfiguration data), for example, by using SfM to restore the three-dimensional shape in the facility or in the stadium from the video data stored in storage ex111. This free viewpoint video is stored in storage ex111. Video information processing apparatus ex101 reads from storage ex111 the video data according to visual field information (and/or viewpoint information) transmitted from video reception apparatus ex103, and transmits the read video data to video reception apparatus ex103. Note that video reception apparatus ex103 may be one of the plurality of cameras ex102.

Variation 3

Video information processing apparatus ex101 may detect a capturing prohibited area. In this case, analyzer ex112 analyzes the captured image, and when the moving camera is capturing the capturing prohibited area, analyzer ex112 transmits a capturing prohibition signal to the moving camera. The moving camera stops capturing while receiving the capturing prohibition signal.

For example, analyzer ex112 matches three-dimensional virtual space restored by using SfM with the captured video, and accordingly analyzer ex112 determines whether the moving camera set in advance in space is capturing the capturing prohibited area. Alternatively, analyzer ex112 determines whether the moving camera is capturing the capturing prohibited area, by using a marker or characteristic object placed in space as a trigger. The capturing prohibited area is, for example, a rest room in the facility or in the stadium.

Moreover, when the user camera is capturing the capturing prohibited area, the user camera may notify the user of a fact that the current place is a capturing prohibited place, by causing a display connected wirelessly or with wires to display a message, or by outputting a sound or voice from a speaker or an earphone.

For example, a fact that capturing in the current direction of the camera orientation is prohibited is displayed as the message. Alternatively, the capturing prohibited area and the current capturing area are indicated on a displayed map. Moreover, the capturing is automatically resumed, for example, when the capturing prohibition signal is no longer output. Moreover, the capturing may be resumed when the capturing prohibition signal is not output and the user performs operations for resuming the capturing. Moreover, when the capturing is stopped and resumed twice or more in a short period, calibration may be performed again. Moreover, notification for checking the current position or for prompting movement may be given to the user.

Moreover, in a case of special work such as the police, pass code or fingerprint authentication or the like that disables such a function may be used for recording. Further, even in such a case, when the video of the capturing prohibited area is displayed or stored outside, image processing such as mosaic may be performed automatically.

The above configuration enables video information processing apparatus ex101 to set a certain area as the capturing prohibited area by performing determination of capturing prohibition and giving the user notification for stopping capturing.

Variation 4

Since it is necessary to collect videos of the plurality of viewpoints in order to construct three-dimensional virtual space from the videos, video information processing system ex100 sets an incentive for a user who transmits a captured video. For example, video information processing apparatus ex101 distributes videos with no charge or at discount rate to the user that transmits a video, or gives the user who transmits a video a point having a monetary value that can be used in an online or off-line store or in a game, or a point having a non-monetary value such as a social status in virtual space such as a game. Moreover, video information processing apparatus ex101 gives a particularly high point to the user who transmits the captured video of a valuable visual field (and/or viewpoint) such as a frequently requested video.

Variation 5

Video information processing apparatus ex101 may transmit additional information to the user camera based on an analysis result made by analyzer ex112. In this case, the user camera superimposes the additional information of the captured video, and displays the superimposed video on a screen. The additional information is, for example, information of a player such as a player name or height when a game in a stadium is captured, and the player name or a photograph of the player's face is displayed in association with each player in the video. Note that video information processing apparatus ex101 may extract the additional information by search via the Internet based on part or all areas of the video data. Moreover, camera ex102 may receive such additional information by the near field communication including Bluetooth (registered trademark) or by visible light communication from illumination of the stadium or the like, and may map the received additional information to the video data. Moreover, camera ex102 may perform this mapping based on a certain rule such as a table that is kept in the storage connected to camera ex102 wirelessly or with wires and that indicates correspondence between the information obtained by the visible light communication technology and the additional information. Camera ex102 may perform this mapping by using a result of a most probable combination by Internet search.

Moreover, in the monitoring system, a highly accurate monitoring system can be implemented, for example, by superimposition of information of a person on a blacklist on the user camera carried by a guard in the facility.

Variation 6

Analyzer ex112 may determine which area in the facility or in the stadium the user camera is capturing, by matching the free viewpoint video with the video captured by the user camera. Note that the method for determining the capturing area is not limited thereto, but various methods for determining the capturing area described in each of the above-described exemplary embodiments or other methods for determining the capturing area may be used.

Video information processing apparatus ex101 transmits a past video to the user camera based on the analysis result made by analyzer ex112. The user camera superimposes the past video on the captured video, or replaces the captured video with the past video, and displays the video on a screen.

For example, a highlight scene of a first half is displayed as a past video during halftime. This enables the user to enjoy the highlight scene of the first half during halftime as a video captured in a direction in which the user is watching. Note that the past video is not limited to the highlight scene of the first half, but may be the highlight scene of the past game held in the stadium. Moreover, timing at which video information processing apparatus ex101 distributes the past video is not limited to timing of distributing during halftime, but may be, for example, timing of distributing after the game end or during the game. In particular, in the case of distributing during halftime, video information processing apparatus ex101 may distribute a scene which the user has missed and which is considered to be important, based on the analysis result made by analyzer ex112. Moreover, video information processing apparatus ex101 may distribute the past video only when there is a user request, or may distribute a message of distribution permission prior to distribution of the past video.

Variation 7

Video information processing apparatus ex101 may transmit advertisement information to the user camera based on the analysis result made by analyzer ex112. The user camera superimposes the advertisement information of the captured video, and displays the superimposed video on a screen.

The advertisement information may be distributed, for example, immediately before distribution of the past video during halftime or after the game end as described in variation 5. This enables a distribution company to obtain advertising rates from an advertiser and to provide the user with video distribution services at a low cost or with no charge. Moreover, video information processing apparatus ex101 may distribute a message of advertisement distribution permission immediately before distribution of the advertisement information, or may provide services with no charge only when the user views the advertisement, or may provide services at a lower cost than a cost in the case where the user does not view the advertisement.

Moreover, when the user clicks "Order now" or the like in response to the advertisement, t a staff member who knows the position of the user based on the system or some positional information, or an automatic delivery system in the facility delivers an ordered drink to a seat of the user. Payment may be made by hand delivery to the staff member, or may be made based on credit card information set in an app of a mobile terminal or the like in advance. Moreover, the advertisement may include a link to an e-commerce site, and on-line shopping such as ordinary home delivery may be possible.

Variation 8

Video reception apparatus ex103 may be one of the cameras ex102 (user cameras).

In this case, analyzer ex112 matches the free viewpoint video with the video captured by the user camera, and accordingly analyzer ex112 determines which area in the facility or in the stadium the user camera is capturing. Note that the method for determining the capturing area is not limited thereto.

For example, when the user performs a swipe operation in a direction of an arrow displayed on a screen, the user camera generates viewpoint information that indicates movement of the viewpoint in the direction. Video information processing apparatus ex101 reads from storage ex111 the video data that captures an area that is moved according to the viewpoint information from the area captured by the user camera determined by analyzer ex112, and video information processing apparatus ex101 starts transmission of the read video data to the user camera. Then, the user camera displays the video distributed from video information processing apparatus ex101, instead of the captured video.

This enables the user in the facility or in the stadium to view the video captured from a favorite viewpoint with such a simple operation as screen swipe. For example, a spectator who is watching a game on a third base side of a baseball stadium can view the video captured from the viewpoint on a first base side. Moreover, the monitoring system enables a guard in the facility to view, for example, the video of the viewpoint from which the guard wants to check or the video to be watched closely as an interruption from a center, while changing the viewpoint adaptively, with such a simple operation as screen swipe. For this reason, a highly accurate monitoring system can be implemented.

Moreover, distribution of the video to the user in the facility or in the stadium is effective, for example, even when an obstacle exists between the user camera and an object to be captured, and there is an invisible area. In this case, the user camera may switch the video of some area of the areas captured by the user camera that includes the obstacle, from the captured video to a video distributed from video information processing apparatus ex101, and may display the distributed video, or the user camera may switch the entire screen from the captured video to the distributed video, and may display the distributed video. Moreover, the user camera may combine the captured video with the distributed video to display the video that seems to penetrate the obstacle such that the object to be viewed is visible. Even when the object to be captured is invisible from the position of the user due to influence of the obstacle, this configuration can reduce the influence of the obstacle because the user can view the video distributed from video information processing apparatus ex101.

Moreover, when the distributed video is displayed as the video of the area invisible due to the obstacle, display switching control different from display switching control depending on input processing made by the user such as the screen swipe described above may be performed. For example, when it is determined that the capturing area includes the obstacle, based on information of movement and capturing direction of the user camera, and based on positional information of the obstacle obtained in advance, display switching from the captured video to the distributed video may be performed automatically. Moreover, when it is determined from analysis of the captured video data that the obstacle which is not the object to be captured is being captured, display switching from the captured video to the distributed video may be performed automatically. Moreover, when area of the obstacle in the captured video (for example, a number of pixels) exceeds a predetermined threshold, or when a ratio of the area of the obstacle to area of the object to be captured exceeds a predetermined proportion, display switching from the captured video to the distributed video may be performed automatically.

Note that the display switching from the captured video to the distributed video, and display switching from the distributed video to the captured video may performed in response to the input processing made by the user.

Variation 9

A speed at which the video data is transmitted to video information processing apparatus ex101 may be instructed based on importance of the video data captured by each camera ex102.

In this case, analyzer ex112 determines importance of video data stored in storage ex111 or importance of camera ex102 that captures the video data. The determination of the importance here is made based on, for example, a number of persons or a number of moving objects in the video, the information such as image quality of the video data, or combination thereof.

Moreover, the determination of the importance of the video data may be made based on the position of camera ex102 that captures the video data or the area captured in the video data. For example, when a plurality of other capturing cameras ex102 exists near camera ex102 concerned, the importance of the video data captured by camera ex102 concerned is set low. Moreover, when the position of camera ex102 concerned is distant from the positions of other cameras ex102, but there exists a plurality of other cameras ex102 that captures an identical area, the importance of the video data captured by camera ex102 concerned is set low. Moreover, the determination of the importance of the video data may be made based on frequency of requests in video distribution services. Note that the method for determining the importance is limited to neither the above-described methods nor combination thereof, but may be a method according to the configuration or purpose of the monitoring system or video distribution system.

Moreover, the determination of the importance may not be made based on the captured video data. For example, the importance of camera ex102 that transmits the video data to terminals other than video information processing apparatus ex101 may be set high. Conversely, the importance of camera ex102 that transmits the video data to terminals other than video information processing apparatus ex101 may be set low. Accordingly, for example, when a plurality of services that needs transmission of video data uses a common communication band, a degree of freedom of controlling the communication band according to a purpose or characteristics of each service increases. This prevents quality of each service to degrade because necessary video data cannot be obtained.

Moreover, analyzer ex112 may determine the importance of the video data by using the free viewpoint video and the captured video of camera ex102.

Video information processing apparatus ex101 transmits a communication speed instruction signal to camera ex102 based on a determination result of the importance made by analyzer ex112. Video information processing apparatus ex101 gives instruction of high speed communication to, for example, camera ex102 that is capturing a video with high importance. Moreover, n addition to speed control, regarding important information, video information processing apparatus ex101 may transmit a signal that instructs a scheme for sending the important information twice or more in order to reduce disadvantages owing to loss. This enables efficient communication in the entire facility or in the entire stadium. Note that communication between camera ex102 and video information processing apparatus ex101 may be wired communication, or may be wireless communication. Moreover, video information processing apparatus ex101 may control only any one of the wired communication and wireless communication.

Camera ex102 transmits the captured video data to video information processing apparatus ex101 at the communication speed according to the communication speed instruction signal. Note that when retransmission fails predetermined number of times, camera ex102 may stop retransmission of the captured video data and start transmission of next captured video data. This enables efficient communication in the entire facility or in the entire stadium and high-speed processing in analyzer ex112 can be implemented.

Moreover, when the communication speed allocated to each camera ex102 fails to have a bandwidth sufficient for transmitting the captured video data, camera ex102 may convert the captured video data into video data with a bit rate that enables transmission at the allocated communication speed, and transmit the converted video data, or may stop transmission of the video data.

Moreover, as described above, when the video data is used for preventing occurrence of a dead angle, only some area of the capturing areas in the captured video data is likely to be needed for filling the dead angle. In this case, camera ex102 may generate extracted video data by extracting at least only the area needed for preventing occurrence of the dead angle from the video data, and transmit the generated extracted video data to video information processing apparatus ex101. This configuration can realize suppression of occurrence of the dead angle at a narrower communication bandwidth.

Moreover, for example, when superimposed display or video distribution of the additional information is performed, camera ex102 needs to transmit the positional information and information of the capturing direction of camera ex102 to video information processing apparatus ex101. In this case, camera ex102 to which only the bandwidth insufficient for transmitting the video data is allocated may transmit only the positional information and information of the capturing direction detected by camera ex102. Moreover, when video information processing apparatus ex101 estimates the positional information and information of the capturing direction of camera ex102, camera ex102 may convert the captured video data into video data with resolution necessary for estimation of the positional information and the information of the capturing direction, and transmit the converted video data to video information processing apparatus ex101. This configuration can also provide superimposed display or video distribution services of the additional information to camera ex102 to which only the narrow communication bandwidth is allocated. Moreover, since video information processing apparatus ex101 can acquire information of the capturing area from more cameras ex102, video information processing apparatus ex101 is effective, for example, for using information of the capturing area for a purpose of detecting an area that attracts attention, or the like.

Note that the above-described switching of transmission processing of the video data according to the allocated communication bandwidth may be performed by camera ex102 based on the notified communication bandwidth, or video information processing apparatus ex101 may determine the operation of each camera ex102 and notify each camera ex102 of a control signal that indicates the determined operation. This enables appropriate sharing of tasks of processing according to an amount of calculation necessary for determination of switching of the operations, throughput of camera ex102, required communication bandwidth, and the like.

Variation 10

Analyzer ex112 may determine the importance of the video data based on the visual field information (and/or viewpoint information) transmitted from video reception apparatus ex103. For example, analyzer ex112 sets high importance of the captured video data including a lot of areas indicated by the visual field information (and/or viewpoint information). Moreover, analyzer ex112 may determine the importance of the video data in consideration of the number of persons or the number of moving objects in the video. Note that the method for determining the importance is not limited thereto.

Note that a communication control method described in the present exemplary embodiment does not necessarily need to be used in a system that reconstructs the three-dimensional shape from the plurality of pieces of video data. For example, when video data is transmitted by wired communication and/or wireless communication selectively or at a different transmission speed in an environment where there exists a plurality of cameras ex102, the communication control method described in the present exemplary embodiment is effective.

Variation 11

In the video distribution system, video information processing apparatus ex101 may transmit an outline video that indicates an entire capturing scene to video reception apparatus ex103.

Specifically, when video information processing apparatus ex101 has received a distribution request transmitted from video reception apparatus ex103, video information processing apparatus ex101 reads the outline video of an inside of the entire facility or an inside of the entire stadium from storage ex111, and transmits the outline video to video reception apparatus ex103. This outline video may have a long update interval (may have a low frame rate), and may have low image quality. A viewer touches a portion to watch in the outline video displayed on a screen of video reception apparatus ex103. Accordingly, video reception apparatus ex103 transmits the visual field information (and/or viewpoint information) corresponding to the touched portion to video information processing apparatus ex101.

Video information processing apparatus ex101 reads the video data corresponding to the visual field information (and/or viewpoint information) from storage ex111, and transmits the video data to video reception apparatus ex103.

Moreover, analyzer ex112 generates the free viewpoint video by preferentially restoring the three-dimensional shape (three-dimensional reconfiguration) of the area indicated by the visual field information (and/or viewpoint information). Analyzer ex112 restores the three-dimensional shape of an inside of the entire facility or an inside of the entire stadium with accuracy in the extent of indicating the outline. Accordingly, video information processing apparatus ex101 can efficiently restore the three-dimensional shape. As a result, a high frame rate and high image quality of the free viewpoint video of the area the viewer wants to watch can be implemented.

Variation 12

Note that video information processing apparatus ex101 may store in advance as a previous video, for example, three-dimensional shape restored data of the facility or stadium generated in advance from design drawings or the like. Note that the previous video is not limited thereto, but may be virtual space data in which unevenness of space obtained from a depth sensor and a picture derived from a past image or video data or an image or video data at a time of calibration are mapped for each object.

For example, when soccer is played in a stadium, analyzer ex112 may restore only the three-dimensional shapes of players and a ball, and generate the free viewpoint video by combining the obtained restored data and the previous video. Alternatively, analyzer ex112 may preferentially restore the three-dimensional shapes of players and a ball. Accordingly, video information processing apparatus ex101 can restore the three-dimensional shape efficiently. As a result, a high frame rate and high image quality of the free viewpoint video regarding players and a ball to which viewers pay attention can be implemented. Moreover, in the monitoring system, analyzer ex112 may preferentially restore only the three-dimensional shapes of persons and moving objects.

Variation 13

Time of each apparatus may be calibrated when capturing starts, based on information such as reference time of the server. Analyzer ex112 restores the three-dimensional shape by using the plurality of pieces of video data captured at time within a preset time range among the plurality of pieces of captured video data captured by the plurality of cameras ex102 in accordance with accuracy of time settings. This detection of time uses, for example, time when the captured video data is stored in storage ex111. Note that the method for detecting time is not limited thereto. Accordingly, since video information processing apparatus ex101 can restore the three-dimensional shape efficiently, a high frame rate and high image quality of the free viewpoint video can be implemented.

Alternatively, analyzer ex112 may restore the three-dimensional shape by using only high-quality data, or by preferentially using high-quality data among the plurality of pieces of video data stored in storage ex111.

Variation 14

Analyzer ex112 may restore the three-dimensional shape by using camera attribute information. In this case, camera ex102 transmits the captured video data and the camera attribute information to video information processing apparatus ex101. Examples of the camera attribute information include a capturing position, a capturing angle, capturing time, and zoom magnification.

Accordingly, since video information processing apparatus ex101 can restore the three-dimensional shape efficiently, a high frame rate and high image quality of the free viewpoint video can be implemented.

Specifically, camera ex102 defines three-dimensional coordinates in the facility or in the stadium, and transmits to video information processing apparatus ex101 information as camera attribute information that indicates an angle, zoom magnification, and time of capturing of certain coordinates by camera ex102, together with the video. Moreover, when camera ex102 is activated, a clock on a communication network in the facility or in the stadium is synchronized with a clock in the camera, and time information is generated.

Figure 12:
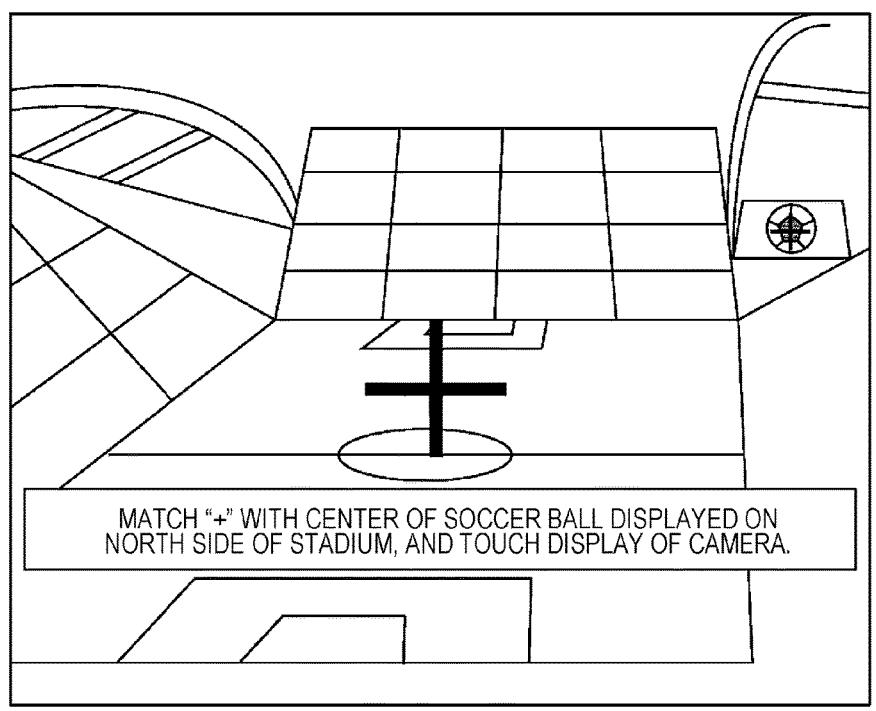
FIG. 12 is a diagram illustrating an example of a notification screen displayed when a camera is activated.

Moreover, the positional and angle information of camera ex102 is acquired by pointing camera ex102 at a specific point in the facility or in the stadium when camera ex102 is activated or at any timing. FIG. 12 is a diagram illustrating an example of notification displayed on a screen of camera ex102 when camera ex102 is activated. When the user matches "+" displayed in a center of the screen with "+" which is in a center of a soccer ball in advertisement in north of the stadium in response to this notification and touches the display of camera ex102, camera ex102 acquires vector information from camera ex102 to the advertisement, and identifies reference of the camera position and angle. Subsequently, camera coordinates and an angle at each time are identified from motion information of camera ex102. Of course, the display is not limited thereto, and display that instructs coordinates, an angle, or a movement speed of the capturing area during a capturing period by using an arrow or the like may be used.

The coordinates of camera ex102 may be identified by using a radio wave of the global positioning system (GPS), wireless fidelity (WiFi) (registered trademark), third generation (3G), long term evolution (LTE), and fifth generation (5G) (wireless LAN), or by using the near field communication such as beacon (Bluetooth (registered trademark), ultrasonic waves). Moreover, information about which base station in the facility or in the stadium has received the captured video data may be used.

Variation 15

The system may be provided as an application that operates on a mobile terminal such as a smartphone.

Accounts of various social networking services (SNS) or the like may be used for login to the system. Note that an account dedicated to an app or a guest account that has limited functions may be used. Favorite videos, favorite accounts or the like can be evaluated by using the accounts in such a manner. Moreover, the bandwidth is preferentially allocated to, for example, video data similar to video data that is being captured or viewed, or to video data of the viewpoint similar to the viewpoint of video data that is being captured or viewed, and this can increase resolution of these pieces of video data. Accordingly, the three-dimensional shape from these viewpoints can be restored with better accuracy.

Moreover, the user can preferentially watch the selected image over other users by selecting a favorite image video and by following the other party with the application, or the user can have connection by text chatting or the like on condition of approval of the other party. Thus, it is possible to generate a new community.

Thus, connection between the users in the community can activate capturing itself or sharing of captured images, and can prompt restoration of three-dimensional shapes with higher accuracy.

Moreover, according to settings of connection in the community, the user can edit images or videos captured by another person, or can perform collage of an image of another person and an image of the user to create a new image or video. This enables sharing of a new video work, such as sharing the new image or video only with persons in the community. Moreover, the video work can also be used for a game of augmented reality or the like by inserting a computer-graphics (CG) character in this editing.

Moreover, since the system enables sequential output of three-dimensional model data, a 3D printer or the like that the facility has can output a three-dimensional object, based on the three-dimensional model data in a characteristic scene such as a goal scene. This also enables sale after the game of an object based on the scene during the game as a souvenir such as a key ring, or distribution after the game of such an object to participating users. Of course, this also enables printing of an image captured from the best viewpoint as an ordinary photograph.

Variation 16

A center connected to the system can used the above-described system to manage a rough state of the overall region, for example, from a video of a vehicle-mounted camera of the police and a wearable camera of a police officer, and the like.

During ordinary patrol, still images are transmitted and received, for example, every several minutes. Moreover, the center identifies a region in which crime is highly likely to occur, based on a criminal map prepared based on a result of analysis using past criminal data or the like. Alternatively, the center keeps regional data related to a crime rate identified in this manner. In a region with the identified high-crime-rate, high frequency of transmission and reception of images may be set, or a change of images to moving images may be made. Moreover, when an incident occurs, moving images or three-dimensional reconfiguration data using SfM may be used. Moreover, the center or each terminal can compensate the image or virtual space by simultaneously using information from other sensors such as a depth sensor and a thermal sensor, and accordingly the police officer can understand the situation with better accuracy.

Moreover, the center can used the three-dimensional reconfiguration data to feed back information of the object to the plurality of terminals. This enables each individual person having a terminal to keep track of the object.

Moreover, in these years, capturing has been performed from the air by an apparatus that can fly such as a quadcopter and a drone, for purposes of investigation of buildings or environment, capturing with realism such as sports or the like. While blur of images is likely to become a problem in capturing by such an autonomous moving apparatus, SfM can create three dimensions while compensating the blur with a position and an inclination. This can realize improvement in image quality and improvement in restoration accuracy of space.

Moreover, installation of a vehicle-mounted camera that captures an outside of a car is mandatory in some countries. In such a vehicle-mounted camera weather and a road surface state in a direction of a destination, traffic congestion level and the like can be understood with better accuracy by using three-dimensional data modeled from a plurality of images.

Third Exemplary Embodiment

The processing described in each of the above-described exemplary embodiments can be carried out easily in a standalone computer system by recording a program for implementing the configuration of the image processing method described in each exemplary embodiment on a storage medium. The storage medium may be any type of medium capable of storing the program, such as a magnetic disk, an optical disc, a magneto-optical disk, an integrated circuit (IC) card, and a semiconductor memory.

Here, application examples of the image processing method described in each of the exemplary embodiments and the systems using the application examples will be further described. The systems include an apparatus that uses the image processing method. A change in other configurations of the systems can be made appropriately in accordance with the circumstances.

Figure 13:
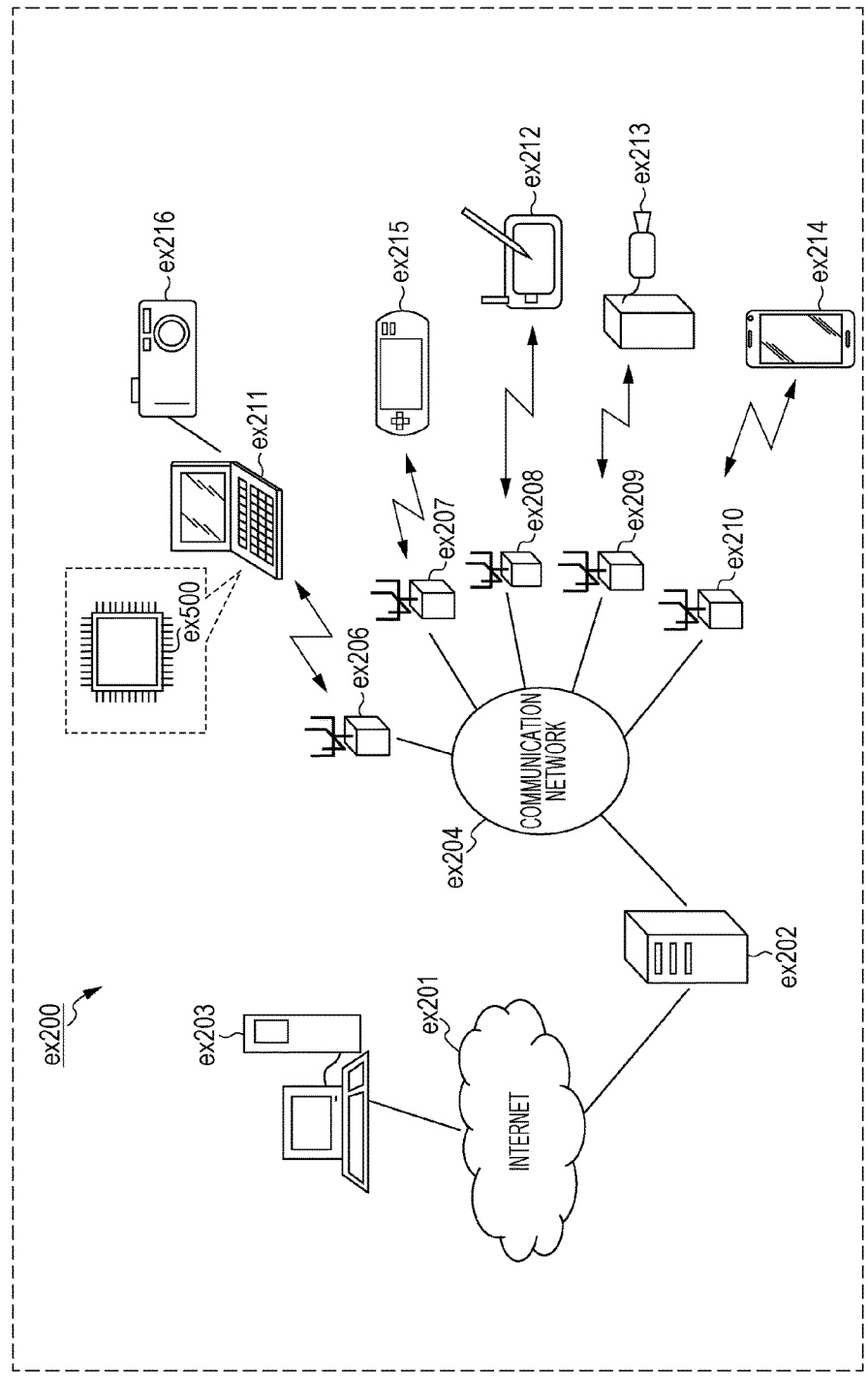
FIG. 13 is an overall configuration diagram of a content providing system that implements content distribution services.

FIG. 13 is a diagram illustrating an overall configuration of content providing system ex200 that implements content distribution services. An area in which communication services are provided is divided with a desired size. Base stations ex206, ex207, ex208, ex209, and ex210 which are fixed wireless stations are installed in respective cells.

In content providing system ex200, various devices such as computer ex211, personal digital assistant (PDA) ex212, camera ex213, smartphone ex214, and game machine ex215 are connected to Internet ex201 via Internet service provider ex202, wide area network (WAN) ex204, and base stations ex206 to ex210.

However, the configuration of content providing system ex200 is not limited to the configuration illustrated in FIG. 13, and any elements may be combined and connected. Moreover, each device may be connected directly to telephone lines, cable TV, or WAN ex204 such as optical communication, instead of via base stations ex206 to ex210 which are fixed wireless stations. Alternatively, each device may be interconnected directly via near field communication or the like.

Camera ex213 is a device capable of capturing moving images, such as a digital camcorder. Camera ex216 is a device capable of capturing still images and moving images, such as a digital camera. Moreover, smartphone ex214 is, for example, a smartphone conforming to a global system for mobile communication (GSM) (registered trademark) scheme, a code division multiple access (CDMA) scheme, a wideband-code division multiple access (W-CDMA) scheme, an long term evolution (LIE) scheme, an high speed packet access (HSPA) scheme, or a communication scheme using high-frequency bands, or a personal handyphone system (PHS), and smartphone ex214 may be any of them.

In content providing system ex200, camera ex213 or the like is connected to streaming server ex203 via base station ex209 and WAN ex204. Accordingly, live streaming or the like becomes possible. In the live streaming, coding processing is performed on content (for example, a video of a music event) captured by the user using camera ex213 and the resulting content is transmitted to streaming server ex203. Meanwhile, streaming server ex203 perform stream distribution of content data transmitted to a client that has made a request. Examples of the client include computer ex211, PDA ex212, camera ex213, smartphone ex214, and game machine ex215 capable of decoding the data that has undergone the coding processing. Each device that has received the distributed data performs decoding processing on the received data to reproduce the data.

Note that the coding processing of the captured video may be performed by camera ex213, or may be performed by streaming server ex203 that performs data transmission processing, or camera ex213 and streaming server ex203 may share tasks of the coding processing of the captured video with each other. Similarly, the decoding processing of the distributed data may be performed by the client, or may be performed by streaming server ex203, or the client and streaming server ex203 may share tasks of the decoding processing of the captured video with each other. Moreover, in addition to still and/or moving image data captured by camera ex213, still and/or moving image data captured by camera ex216 may be transmitted to streaming server ex203 via computer ex211. In this case, the coding processing may be performed by any of camera ex216, computer ex211, and streaming server ex203, or camera ex216, computer ex211, and streaming server ex203 may share tasks of the coding processing with each other. Further, regarding display of the decoded image, a plurality of devices connected to the system may cooperate to display an identical image, or a device having a large display unit may display the entire image and a device such as smartphone ex214 may enlarge and display some area of the image.

Moreover, the coding processing and the decoding processing are performed in general by LSI ex500 in computer ex211 or each device. LSI ex500 may be formed as a single chip or a plurality of chips. Note that software for coding/decoding a moving image may be recorded on any recording medium (such as a CD-ROM, a flexible disk, and a hard disk) that is readable by computer ex211 or the like, and the coding processing and the decoding processing may be performed using the software. Further, in the case where smartphone ex214 is equipped with a camera, moving image data acquired by the camera may be transmitted. This moving image data is data that has been coded by LSI ex500 in smartphone ex214.

Moreover, streaming server ex203 may be a plurality of servers or a plurality of computers that processes, records, and distributes data.

In the above-described manner, content providing system ex200 enables the client to receive and reproduce coded data. Thus, content providing system ex200 enables the client to receive, decode, and reproduce in real time information transmitted by a user, and enables even a user having no special right or equipment to implement personal broadcasting.

Figure 14:
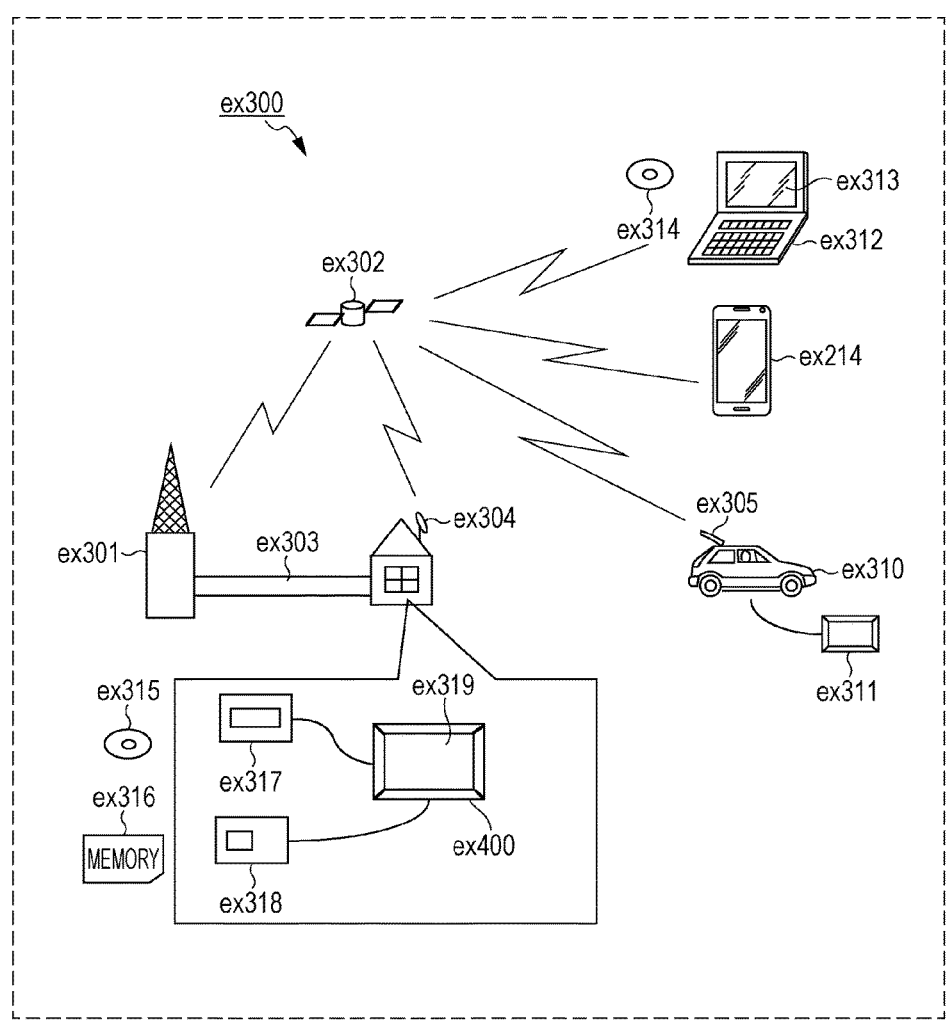
FIG. 14 is an overall configuration diagram of a digital broadcasting system.

Note that in addition to the example of content providing system ex200, each of the above-described exemplary embodiments may also be applied to digital broadcasting system ex300, as illustrated in FIG. 14. Specifically, broadcasting station ex301 transmits a radio wave of multiplexed data obtained by multiplexing video data with music data or the like via communication to broadcasting satellite ex302. This video data is data coded by the moving image coding method described in each of the above-described exemplary embodiments. Broadcasting satellite ex302 that has received this data transmits a broadcasting radio wave, and home antenna ex304 capable of receiving satellite broadcasting receives this radio wave. An apparatus such as television (receiver) ex400 or set top box (STB) ex317 decodes and reproduces the received multiplexed data.

Moreover, the moving image decoding apparatus or the moving image coding apparatus described in each of the above-described exemplary embodiments can be implemented in reader/recorder ex318 that reads and decodes the multiplexed data recorded on recording medium ex315 such as a digital versatile disc (DVD) and a blu-ray disc (BD) or memory ex316 such as an secured digital (SD), or that codes a video signal and further multiplexes the video signal with a music signal depending on circumstances, and writes the resulting signal on recording medium ex315 or memory ex316. In this case, monitor ex319 may display the reproduced video signal, and another apparatus or system can reproduce the video signal by using recording medium ex315 or memory ex316 having the multiplexed data recorded thereon. Moreover, the moving image decoding apparatus may be implemented in set top box ex317 connected to cable ex303 for a community antenna television system (CATV) or antenna ex304 for satellite/terrestrial broadcasting, and monitor ex319 of the television may display the video signal. At this time, the moving image decoding apparatus may be incorporated into the television instead of the set top box.

Figure 15:
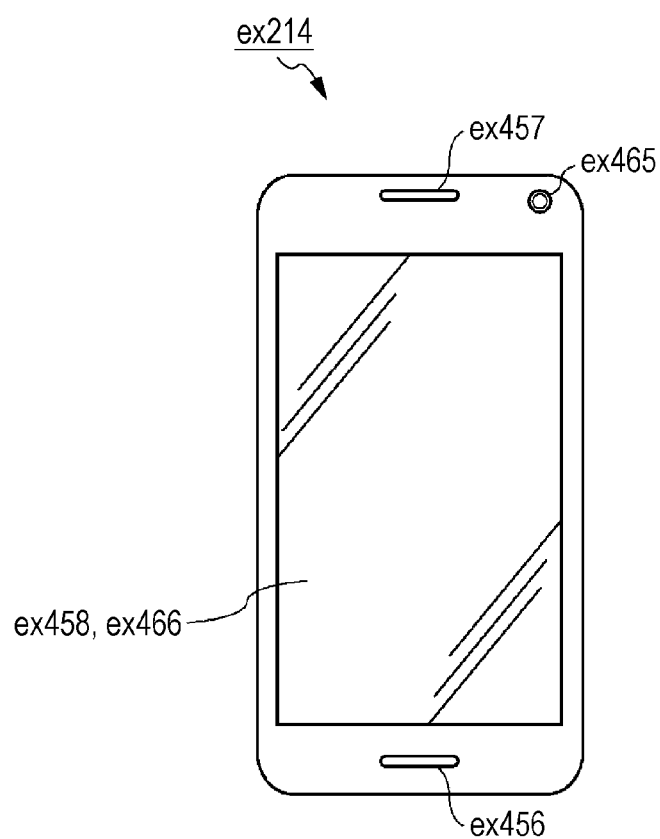
FIG. 15 is a diagram illustrating an example of a smartphone.
Figure 16:
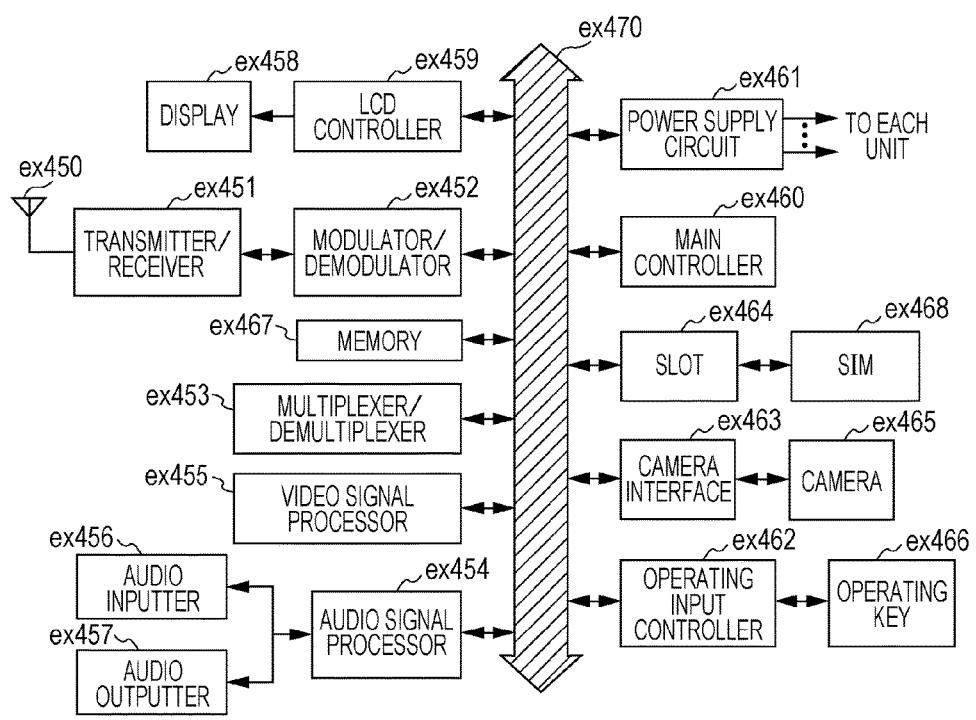
FIG. 16 is a block diagram illustrating a configuration example of a smartphone.

FIG. 15 is a diagram illustrating smartphone ex214. Moreover, FIG. 16 is a diagram illustrating a configuration example of smartphone ex214. Smartphone ex214 includes antenna ex450 that transmits and receives a radio wave to and from base station ex210, camera ex465 capable of capturing a video and a still image, and display unit ex458 such as a liquid crystal display that displays the video captured by camera ex465 and data obtained by decoding a video or the like received on antenna ex450. Smartphone ex214 further includes operation unit ex466 which is a touch panel or the like, audio outputter ex457 such as a speaker for outputting audio, audio inputter ex456 such as a microphone for inputting audio, memory unit ex467 capable of storing coded data or decoded data of a captured video, a captured still image, recorded audio, a received video, a received still image, or a received email, memory ex316 illustrated in FIG. 14, or slot ex464 which is an interface to SIM ex468 for identifying a user and for authentication of access to various types of data including a network.

In smartphone ex214, power supply circuit ex461, operation input controller ex462, video signal processor ex455, camera interface ex463, liquid crystal display (LCD) controller ex459, modulator/demodulator ex452, multiplexer/demultiplexer ex453, audio signal processor ex454, slot ex464, and memory unit ex467 are connected via bus ex470 to main controller ex460 that comprehensively controls display unit ex458, operation unit ex466 and the like, respectively.

When an on-hook/power key is turned on by a user operation, power supply circuit ex461 supplies electric power to each unit from a battery pack, and accordingly activates smartphone ex214 into an operable state.

In smartphone ex214 based on control of main controller ex460 that includes a CPU, a ROM, a RAM and the like, audio signal processor ex454 converts an audio signal recorded with audio inputter ex456 in a voice call mode into a digital audio signal, and modulator/demodulator ex452 performs spread spectrum processing on this digital audio signal, and transmitter/receiver ex451 performs digital-to-analog conversion processing and frequency conversion processing on this signal and then transmits the resulting signal via antenna ex450. Moreover, smartphone ex214, amplifies reception data received via antenna ex450 in the voice call mode and performs frequency conversion processing and analog-to-digital conversion processing on the data, and modulator/demodulator ex452 performs spread spectrum processing on the resulting signal, and audio signal processor ex454 converts the resulting signal into an analog audio signal, and then audio outputter ex457 outputs the analog audio signal.

In the case where an email is transmitted in a data communication mode, text data of the email input by operation of operation unit ex466 or the like of a body is sent to main controller ex460 via operation input controller ex462. In main controller ex460 modulator/demodulator ex452 performs spread spectrum processing on the text data, and transmitter/receiver ex451 performs digital-to-analog conversion processing and frequency conversion processing on the text data and then transmits the resulting text data to base station ex210 via antenna ex450. In the case of receiving an email, substantially the opposite processing is performed on the received data, and the resulting data is output to display unit ex458.

In the case where a video, a still image, or a combination of a video and audio are transmitted in the data communication mode, video signal processor ex455 compresses and codes a video signal supplied from camera ex465 by the moving image coding method described in each of the above exemplary embodiments, and sends the coded video data to multiplexer/demultiplexer ex453. Moreover, audio signal processor ex454 codes an audio signal recorded with audio inputter ex456 while the video, the still image, or the like is being captured by camera ex465, and sends the coded audio data to multiplexer/demultiplexer ex453.

Multiplexer/demultiplexer ex453 multiplexes the coded video data supplied from video signal processor ex455 and the coded audio data supplied from audio signal processor ex454 by a predetermined scheme. Modulator/demodulator (modulation/demodulation circuit) ex452 performs spread spectrum processing on the resulting multiplexed data. Transmitter/receiver ex451 performs digital-to-analog conversion processing and frequency conversion processing on the multiplexed data, and then transmits the resulting data via antenna ex450.

In the case of receiving data of a moving image file linked to a website or the like in the data communication mode, or in the case of receiving an email having a video or audio attached thereto, multiplexer/demultiplexer ex453 demultiplexes multiplexed data into a bitstream of video data and a bitstream of audio data in order to decode the multiplexed data received via antenna ex450. Multiplexer/demultiplexer ex453 supplies the coded video data to video signal processor ex455 and the coded audio data to audio signal processor ex454 via synchronization bus ex470. Video signal processor ex455 decodes the video signal by a moving image decoding method corresponding to the moving image coding method described in each of the above exemplary embodiments. Display unit ex458 displays via LCD controller ex459 a video or still image in the moving image file linked to the website. Moreover, audio signal processor ex454 decodes the audio signal, and audio outputter ex457 outputs audio.

Moreover, like television ex400, three implementation forms of a terminal such as smartphone ex214, that is, a transmission/reception terminal including both an encoder and a decoder, a transmission terminal including only an encoder, and a reception terminal including only a decoder, are conceivable. Further, digital broadcasting system ex300 in which multiplexed data obtained by multiplexing video data with music data or the like is received and transmitted is described above; however, the multiplexed data may be data obtained by multiplexing text data or the like related to the video other than audio data, or may be video data as is instead of the multiplexed data.

Moreover, the present disclosure is not limited to the above-described exemplary embodiments, and various variations or modifications can be made without departing from the scope of the present disclosure.

The present disclosure can restore the three-dimensional model and be applied to the system or device that performs, for example, the three-dimensional reconfiguration.

What is claimed is:

1. An image processing method comprising:
    acquiring, by a processor of an image processing system, a plurality of first images, each of the plurality of first images taken with each of a plurality of imaging devices, the plurality of imaging devices including a first imaging device and a second imaging device;
    acquiring, by the processor, first imaging clock times, each of the first imaging clock times corresponding to each of the plurality of first images;
    selecting, by the processor, a plurality of second images from the plurality of first images by comparing the first imaging clock times with each other, each of second imaging clock times corresponding to each of the plurality of second images, the second imaging clock times (i) being substantially matched with each other and (ii) included in the first imaging clock times;
    generating, by the processor, an image set constructed with the plurality of second images;
    determining, by the processor, that the first imaging device that captures a first image corresponding to a first clock time and the second imaging device that captures a second image corresponding to a second clock time are synchronous when an overlap exists between the first imaging clock time and the second imaging clock time;
    calculating, by the processor, three-dimensional information indicating three-dimensional states of at least one of (i) a second plurality of imaging devices, each of the second plurality of imaging devices take each of the plurality of second images and (ii) subjects, each of subjects are imaged in each of the plurality of second images based on the plurality of second images included in the image set; and
    outputting, by the processor, the calculated three-dimensional information,
    wherein, in the selecting, (i) a specific image that is one of the plurality of first images, and (ii) at least one exposure overlapping image that is an image acquired by the imaging whose exposure overlaps imaging exposure of the specific image, are selected as the plurality of second images.

2. The image processing method according to claim 1, wherein
    the three-dimensional information indicates at least one of (i) positions and (ii) postures, each of the positions and each of the postures corresponding to each of the second plurality of imaging devices.

3. The image processing method according to claim 1, wherein
    the three-dimensional information indicates at least one of (i) positions and (ii) postures, each of the positions and each of the postures corresponding to each of the subjects which are imaged in each of the plurality of second images.

4. The image processing method according to claim 1, wherein
    in the acquiring of the first imaging clock times, the first imaging clock times are acquired, the first imaging clock times indicating with time accuracy higher than any other exposure time which are used in imaging of the plurality of first images.

5. The image processing method according to claim 1, wherein
    in the acquiring of the plurality of first images, a first plurality of image signals are acquired, the first plurality of image signals including the plurality of first images, each of the plurality of image signals corresponding to each of the plurality of imaging devices,
    in the selecting, a second plurality of image signals are selected from the first plurality of image signals, the second plurality of image signals including the plurality of second images, the second imaging clock times are substantially matched with each other, and
    in the generating, the image set constructed with the second plurality of image signals is generated.

6. The image processing method according to claim 5, wherein
one of the first plurality of image signals is moving image data including a plurality of images and clock time information for acquiring the first imaging clock times, and
in acquiring of the first imaging clock times, the first imaging clock times by image signal basis based on the clock time information are acquired, each of the first imaging clock times corresponding to each of the plurality of first images.

7. The image processing method according to claim 5, wherein
one of the plurality of image signals is image data including one of the plurality of first images and clock time information for acquiring one of the imaging clock times corresponding to the one of the plurality of first images, and
in acquiring of the first imaging clock times, one of the first imaging clock times by image signal basis based on the clock time information are acquired, the one of the first imaging clock time corresponding to the one of the plurality of first images.

8. The image processing method according to claim 1, further comprising:
generating, by the processor, an image of an area, where a subject is estimated to be at a standstill at a clock time different from an imaging clock time of an original image as a still image in which the clock time is set to the imaging clock time, from the original image acquired by a processing target device that is one of the plurality of imaging devices, the still image regarded as acquired by the processing target device, wherein
in the selecting, the plurality of second images in which the second imaging clock times are substantially matched with each other are selected from the plurality of first images and the still image.

9. The image processing method according to claim 8, wherein
in the generating of an image of an area,
the area in the original image is specified by comparing the original image with, at least one image (i) acquired with the processing target device and (ii) acquired in at least one of the clock times before and after the imaging clock time of the original image and generating the still image.

10. The image processing method according to claim 9, wherein
in the generating of an image of an area,
the area is specified in each processing unit constituting the original image by judging whether the processing unit corresponds to the area, and
the processing unit is a block, an object block taken in the original image, or a sub-object indicated by dividing the object.

11. The image processing method according to claim 1, further comprising
generating, by the processor, a temporal interpolated image in which a clock time different from an imaging clock time of each of a plurality of reference images is set to an imaging clock time as an image acquired from a processing target device, which is one of the plurality of imaging devices, by temporally interpolating the plurality of reference images that are a plurality of images acquired from the processing target device, wherein in the selecting, a plurality of images in which imaging clock times are substantially matched with each other are selected from the plurality of first images and the generated temporal interpolated image.

12. The image processing method according to claim 11, wherein
in the generating of the temporal interpolated image, the interpolated image is generated based on a uniform motion model.

13. The image processing method according to claim 11, wherein
in the generating of the temporal interpolated image,
the temporal interpolation is performed in each processing unit constituting each of the plurality of reference images, and
the processing unit is a block, an object block taken in the original image, or a sub-object indicated by dividing the object.

14. An image processing system comprising:
a processor; and
a memory having a computer program stored thereon, the computer program causing, when the computer program is executed, the processor to execute operations including:
acquiring a plurality of first images, each of the plurality of first images taken with each of a plurality of imaging devices, the plurality of imaging devices including a first imaging device and a second imaging device;
acquiring first imaging clock times, each of the first imaging clock times corresponding to each of the plurality of first images;
selecting a plurality of second images from the plurality of first images by comparing the first imaging clock times with each other, each of second imaging clock times corresponding to each of the plurality of second images, the second imaging clock times (i) being substantially matched with each other and (ii) included in the first imaging clock times;
generating an image set constructed with the plurality of second images;
determining that the first imaging device that captures a first image corresponding to a first clock time and the second imaging device that captures a second image corresponding to a second clock time are synchronous when an overlap exists between the first imaging clock time and the second imaging clock time;
calculating three-dimensional information indicating three-dimensional states of at least one of (i) a second plurality of imaging devices, each of the second plurality of imaging devices take each of the plurality of second images and (ii) subjects, each of subjects are imaged in each of the plurality of second images based on the plurality of second images included in the image set; and
outputting the calculated three-dimensional information, wherein, in the selecting, (i) a specific image that is one of the plurality of first images, and (ii) at least one exposure overlapping image that is an image acquired by the imaging whose exposure overlaps imaging exposure of the specific image, are selected as the plurality of second images.

15. A non-transitory recording medium having a computer program stored thereon, the computer program causing a processor to execute operations comprising:
acquiring a plurality of first images, each of the plurality of first images taken with each of a plurality of imaging devices, the plurality of imaging devices including a first imaging device and a second imaging device;

acquiring first imaging clock times, each of the first imaging clock times corresponding to each of the plurality of first images;

selecting a plurality of second images from the plurality of first images by comparing the first imaging clock times with each other, each of second imaging clock times corresponding to each of the plurality of second images, the second imaging clock times (i) being substantially matched with each other and (ii) included in the first imaging clock times;

generating an image set constructed with the plurality of second images;

determining that the first imaging device that captures a first image corresponding to a first clock time and the second imaging device that captures a second image corresponding to a second clock time are synchronous when an overlap exists between the first imaging clock time and the second imaging clock time;

calculating three-dimensional information indicating three-dimensional states of at least one of (i) a second plurality of imaging devices, each of the second plurality of imaging devices take each of the plurality of second images and (ii) subjects, each of subjects are imaged in each of the plurality of second images based on the plurality of second images included in the image set; and outputting the calculated three-dimensional information, wherein, in the selecting, (i) a specific image that is one of the plurality of first images, and (ii) at least one exposure overlapping image that is an image acquired by the imaging whose exposure overlaps imaging exposure of the specific image, are selected as the plurality of second images.

\* \* \* \* \*